United States Patent
Tada et al.

(10) Patent No.: US 10,514,793 B2
(45) Date of Patent: Dec. 24, 2019

(54) TOUCH SENSOR PANEL

(71) Applicant: FUJIFILM Corporation, Tokyo (JP)

(72) Inventors: Nobuyuki Tada, Kanagawa (JP);
Akihiro Hashimoto, Kanagawa (JP);
Yasushi Endo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 15/794,977

(22) Filed: Oct. 26, 2017

(65) Prior Publication Data
US 2018/0059845 A1    Mar. 1, 2018

Related U.S. Application Data

(63) Continuation of application No. PCT/JP2016/064116, filed on May 12, 2016.

(30) Foreign Application Priority Data

May 19, 2015    (JP) ................. 2015-102225

(51) Int. Cl.
*G06F 3/041*    (2006.01)
*G06F 3/047*    (2006.01)
*G02F 1/1333*    (2006.01)
*G02F 1/1362*    (2006.01)

(52) U.S. Cl.
CPC ............ *G06F 3/0412* (2013.01); *G06F 3/047* (2013.01); *G06F 3/0416* (2013.01); *G02F 1/13338* (2013.01); *G02F 1/136286* (2013.01)

(58) Field of Classification Search
CPC ....... G06F 3/0416; G06F 3/041; G06F 3/0412
See application file for complete search history.

(56) References Cited

U.S. PATENT DOCUMENTS

2010/0080964 A1    4/2010   Kano et al.
2012/0132930 A1*   5/2012   Young ................ H01L 31/0481
                                                                257/84

(Continued)

FOREIGN PATENT DOCUMENTS

JP    2003-078320 A    3/2003
JP    2003-213437 A    7/2003

(Continued)

OTHER PUBLICATIONS

International Search Report issued in PCT/JP2016/064116; dated Jul. 19, 2016.

(Continued)

*Primary Examiner* — Gerald Johnson
(74) *Attorney, Agent, or Firm* — Studebaker & Brackett PC

(57) ABSTRACT

A touch sensor panel has a touch sensor portion which is provided on a substrate and includes a detection portion and a peripheral wiring portion, an antenna, a transmission line portion connected to the antenna, and a control board connected to the touch sensor portion and the transmission line portion. The transmission wiring portion has a signal wire which is provided on one surface of the substrate and connected to the antenna and two ground wires which are provided on the other surface of the substrate across a disposition region corresponding to a region, in which the signal wire is provided, and electrically connected to each other at least at an end on the antenna side.

16 Claims, 7 Drawing Sheets

(56) References Cited

U.S. PATENT DOCUMENTS

| | | | | |
|---|---|---|---|---|
| 2013/0059532 A1* | 3/2013 | Mahanfar | ............ | H04B 5/0031 |
| | | | | 455/41.1 |
| 2013/0113713 A1* | 5/2013 | Mienko | .................. | G06F 3/044 |
| | | | | 345/173 |
| 2014/0043261 A1 | 2/2014 | Wang et al. | | |
| 2014/0176819 A1* | 6/2014 | Yilmaz | ................. | G06F 1/1692 |
| | | | | 349/12 |
| 2016/0188092 A1* | 6/2016 | Sebastian | .............. | G06F 3/0416 |
| | | | | 345/174 |

FOREIGN PATENT DOCUMENTS

| | | | |
|---|---|---|---|
| JP | 2004-289578 | A | 10/2004 |
| JP | 2006-058797 | A | 3/2006 |
| JP | 2006-064923 | A | 3/2006 |
| JP | 2006-135271 | A | 5/2006 |
| JP | 2009-007540 | A | 1/2009 |
| JP | 2009-280905 | A | 12/2009 |
| JP | 2010-084196 | A | 4/2010 |
| JP | 2011-129501 | A | 6/2011 |
| JP | 2013-114506 | A | 6/2013 |
| JP | 2013-149236 | A | 8/2013 |

OTHER PUBLICATIONS

Written Opinion issued in PCT/JP2016/064116; dated Jul. 19, 2016.
"Plastic Method for Determining Total Light Transmittance and Total Light Reflectance"; Japanese Industrial Standards; 2008; pp. 1-9; JIS K 7375.

* cited by examiner

TOUCH SENSOR PANEL

CROSS-REFERENCE TO RELATED APPLICATIONS

This application is a Continuation of PCT International Application No. PCT/JP2016/064116 filed on May 12, 2016, which claims priority under 35 U.S.C. § 119(a) to Japanese Patent Application No. 2015-102225 filed on May 19, 2015. The above application is hereby expressly incorporated by reference, in its entirety, into the present application.

BACKGROUND OF THE INVENTION

1. Field of the Invention

The present invention relates to a touch sensor panel including an antenna. Particularly, the present invention relates to a touch sensor panel in which a resonance phenomenon in a transmission line of an antenna is avoided and a transmission loss is reduced.

2. Description of the Related Art

Currently, mobile terminal apparatuses mounted with a touch panel called a smartphone, a tablet, and the like are being increasingly improved in terms of function, compactified, thinned, and lightened. These mobile terminal apparatuses are mounted with a plurality of antennas such as an antenna for telephone, an antenna for wireless fidelity (WiFi), and an antenna for Blue tooth (registered trademark). The antennas are connected to a control board and the like of the mobile terminal apparatuses through a transmission line such as a coaxial cable.

JP2003-078320A describes an antenna unit including an antenna and a connection cable and a computer terminal including the antenna unit. In JP2003-078320A, a constitution is adopted in which a radio wave resonance portion and a connection cable are integrally formed on a flexible insulating film by using the technique of flexible printed circuit (FPC). By adopting such a constitution, the antenna and the connection cable can be freely folded, and a degree of freedom of disposition is heightened.

JP2004-289578A describes a mobile antenna used in electronic apparatuses such as a note-type personal computer and a mobile phone. The mobile antenna in JP2004-289578A includes an antenna portion, which is an inverted F-shaped antenna having a radio wave resonance portion, and a connection cable connecting the antenna portion to a connector of the body side of a mobile apparatus, and the antenna portion and the connection cable are integrally formed using a flexible printed circuit board. The connection cable is shielded with a shielding material for impedance matching, approximately over the full length thereof in a longitudinal direction except for a standing portion.

SUMMARY OF THE INVENTION

In a case where an antenna is mounted on a mobile terminal apparatus including a touch panel as described above, in order to maintain the performance of the antenna, it is desirable for the antenna to have an antenna length dependent on the wavelength of a communication frequency. Therefore, an optimized antenna module including an antenna is prepared, and a structure is established by connecting the antenna module to an internal substrate of the mobile terminal apparatus through a transmission line such as a coaxial cable. As described above, mobile terminal apparatuses are being increasingly compactified, thinned, and lightened, and consequently, it is difficult to secure a space for installing the antenna module. Accordingly, a new portion in which the antenna module including the transmission line is provided is considered.

As described above, in JP2003-078320A, by integrally forming the radio wave resonance portion and the connection cable on the flexible insulating film, a degree of freedom of disposition is heightened. In JP2004-289578A, the antenna portion and the connection portion are formed using a flat plate-like flexible printed circuit board, such that the antenna portion and the connection portion can be adapted to the thinned and lightened electronic apparatuses and can be disposed in a narrow space by the flexibility of the connection portion.

However, in all of JP2003-078320A and JP2004-289578A, only the impedance matching is considered, and the resonance is dealt with simply by shielding the entirety of the cable. Accordingly, the resonance resulting from the structure occurs in some cases. In order to reduce a transmission loss, it is preferable that the transmission line of an antenna has low resistance. However, currently, there is no transmission line of an antenna that avoids a resonance phenomenon and makes a small transmission loss.

Objects of the present invention are to solve the aforementioned problems of the technique of the related art and to provide a touch sensor panel including an antenna in which a resonance phenomenon in a transmission line portion of an antenna is avoided, and a transmission loss is reduced even though a sheet resistance is increased.

In order to achieve the aforementioned objects, an aspect of the present invention provides a touch sensor panel comprising a substrate, a touch sensor portion which is provided on the substrate and includes a detection portion and a peripheral wiring portion, an antenna provided on the substrate, a transmission line portion which is provided on the substrate and connected to the antenna, and a control board connected to the touch sensor portion and the transmission line portion, wherein the transmission line portion has a signal wire which is provided on one surface of the substrate and connected to the antenna and two ground wires which are provided on the other surface of the substrate across a disposition region corresponding to a region, in which the signal wire is provided, and electrically connected to each other at least at an end of the transmission line portion on the antenna side.

It is preferable that an anti-resonance wire formed of a conductive wire is provided on a side of each of the ground wires opposite to the disposition region.

It is preferable that a plurality of connection terminals are formed at an end of each of the ground wires on the control board side.

It is preferable that the peripheral wiring portion included in the touch sensor portion, the transmission line portion, and the antenna are formed of the same material. Furthermore, it is preferable that the peripheral wiring portion included in the touch sensor portion, the transmission line portion, and the antenna have the same thickness. In addition, it is preferable that a sheet resistance of the transmission line portion is 0.01 to 10 Ω/sq.

According to the present invention, it is possible to avoid a resonance phenomenon in a transmission line portion of an antenna and to reduce a transmission loss even though a sheet resistance is increased.

DESCRIPTION OF THE PREFERRED EMBODIMENTS

Hereinafter, the touch sensor panel and the substrate of the present invention will be specifically described based on suitable embodiments shown in the attached drawings.

In the following description, "to" showing a range of numerical values includes the numerical values listed before and after "to". For example, in a case where ε is between a numerical value α and a numerical value β, the range of s includes the numerical value α and the numerical value β, which is represented by mathematical symbols of $\alpha \leq \varepsilon \leq \beta$.

An "optically transparent" substance and a simply "transparent" substance both have a light transmittance of at least equal to or higher than 60% in the wavelength region of visible light at a wavelength of 400 to 800 nm. The light transmittance is preferably equal to or higher than 75%, more preferably equal to or higher than 80%, and even more preferably equal to or higher than 85%.

The light transmittance is measured using "Testing methods for total light transmittance and total light reflectance of plastics" specified in JIS K 7375:2008, for example.

Figure 1:
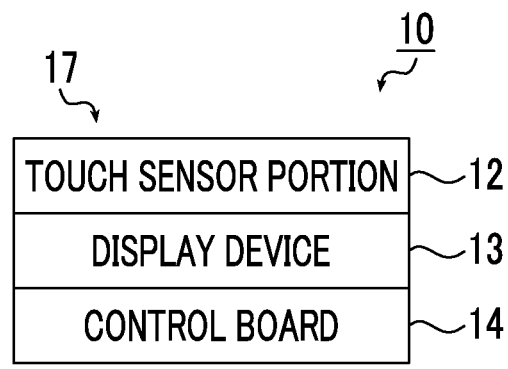
FIG. 1 is a schematic view showing the constitution of a mobile terminal having a touch sensor panel of a first embodiment of the present invention.
Figure 2:
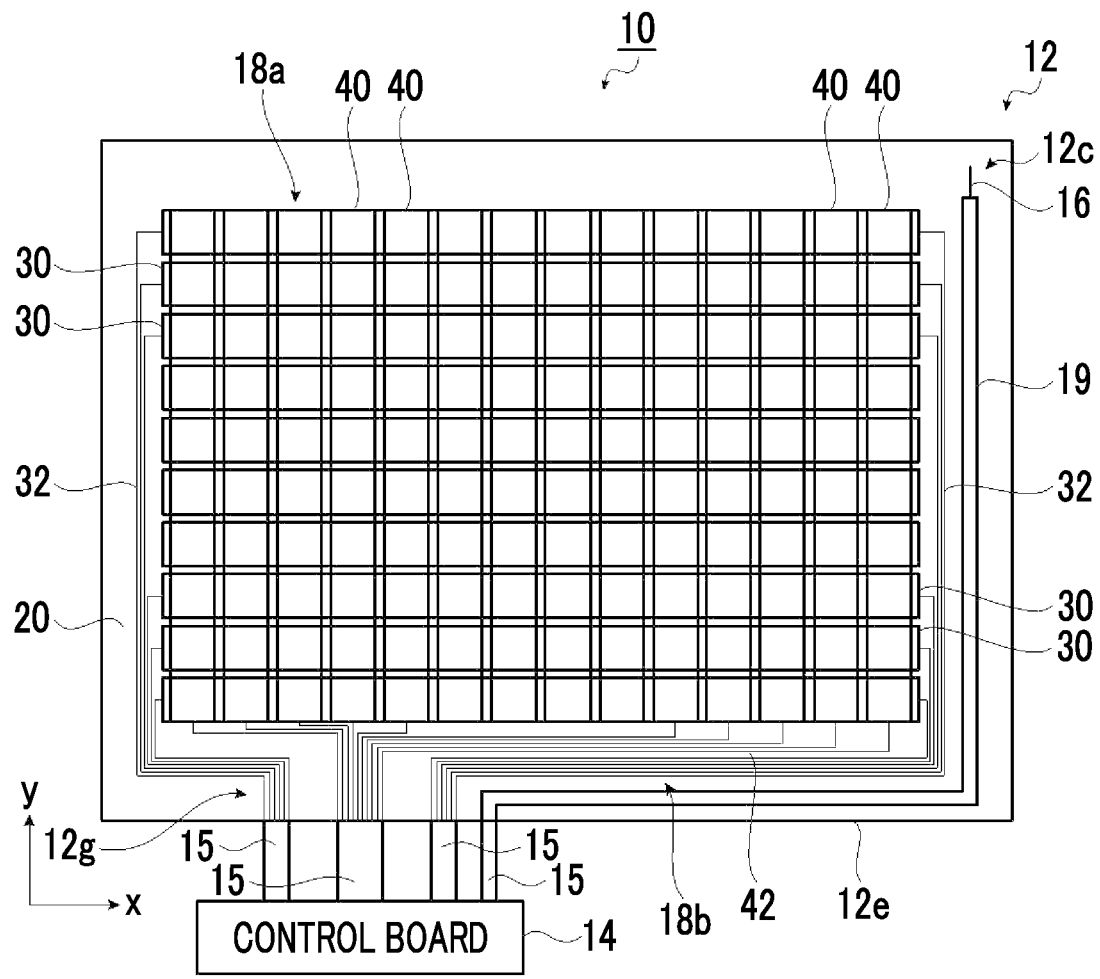
FIG. 2 is a schematic plan view showing the touch sensor panel of the first embodiment of the present invention.

FIG. 1 is a schematic view showing the constitution of a mobile terminal having a touch sensor panel of the first embodiment of the present invention. FIG. 2 is a schematic plan view showing the touch sensor panel of the first embodiment of the present invention.

The touch sensor panel of the present invention is used in a mobile terminal apparatus mounted with a touch panel.

As shown in FIG. 1, the touch sensor panel 10 of the present embodiment is used together with a display device 13 such as a liquid crystal display device. The touch sensor panel 10 is provided on the display device 13. Therefore, in the touch sensor panel 10, a region corresponding to an image displayed by the display device 13 is transparent such that the image displayed by the display device 13 is recognized. The display device 13 is not particularly limited as long as a predetermined image including a motion picture or the like can be displayed on a screen. In addition to the aforementioned liquid crystal display device, for example, an organic electro luminescence (EL) display device, electronic paper, and the like can be used.

A mobile terminal apparatus 17, which is mounted with a touch panel that allows communication, is constituted with the touch sensor panel 10 and the display device 13.

The touch sensor panel 10 shown in FIG. 2 has a touch sensor portion 12 and a control board 14 controlling the touch sensor portion 12. As shown in FIG. 1, the display device 13 is disposed between the touch sensor portion 12 and a control board 14. As shown in FIG. 2, an antenna 16 is provided in the touch sensor portion 12.

As shown in FIG. 2, the touch sensor portion 12 and the control board 14 are electrically connected to each other through flexible printed circuits (FPC) 15, for example. The electric connection between the touch sensor portion 12 and the control board 14 is not limited to the flexible printed circuits 15, and the touch sensor portion 12 and the control board 14 may also be electrically connected to each other through a connector (not shown in the drawing). The antenna 16 is electrically connected to the control board 14 through a transmission line portion 19 and the flexible printed circuits 15.

The control board 14 is mounted with a control circuit (not shown in the drawing) that controls the display device 13, the touch sensor portion 12, and data communication through the antenna 16. The control circuit is constituted with an electronic circuit, for example. Due to the control board 14, the antenna 16 can transmit a transmission signal and receive a reception signal, and information can be exchanged with external apparatuses.

In a case where a sensor portion 18a, which will be specifically described later, of the touch sensor portion 12 is touched with a finger or the like, a change in capacitance occurs in the touched position if the touch sensor portion is a capacitance type. The change in capacitance is detected by the control board 14, and the coordinates of the touched position are specified. The control board 14 is constituted with a known device used for position detection in a general touch panel. In a case where the touch sensor portion 12 is a capacitance type, a capacitance-type control circuit is used. Furthermore, in a case where the touch sensor portion 12 is a resistive film type, a resistive film-type control circuit is appropriately used.

In the control board 14, as the control circuit controlling the display device 13 and the control circuit controlling data communication, known circuits can be appropriately used.

The x-axis direction and the y-axis direction shown in FIG. 2 are orthogonal to each other. In the touch sensor portion 12 of the touch sensor panel 10, a plurality of first conductive layers 30 extending in the x-axis direction are disposed in the y-axis direction at an interval. Furthermore, a plurality of second conductive layers 40 extending in the y-axis direction are disposed in the x-axis direction at an interval.

One end of each of the first conductive layers 30 is electrically connected to first wiring 32. One end of each of the second conductive layers 40 is electrically connected to second wiring 42. For some of the first conductive layers 30, the first wiring 32 connected thereto is not shown in the drawing. For some of the second conductive layers 40, the second wiring 42 connected thereto is not shown in the drawing.

Each first wiring 32 and each second wiring 42 gather in a wire connection region 12g of an end 12e of the substrate 20 and are connected to the control board 14 respectively through the flexible printed circuits 15.

The first conductive layer 30 and the second conductive layer 40 both function as a detection electrode detecting a touch that occurs on the touch sensor panel 10. The sensor portion 18a detecting a touch is constituted with the first conductive layers 30 and the second conductive layers 40. The first wiring 32 and the second wiring 42 are collectively referred to as a peripheral wiring portion 18b.

The first conductive layers 30 and the second conductive layers 40 have the same constitution, and the first wiring 32 and the second wiring 42 have the same constitution.

Figure 3:
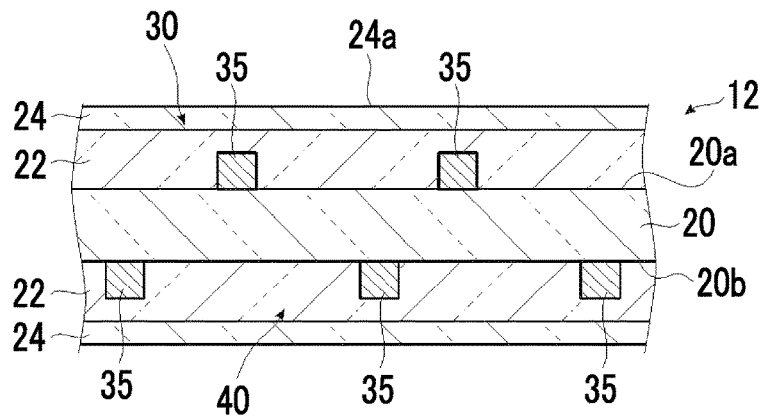
FIG. 3 is a schematic cross-sectional view showing the touch sensor panel of the first embodiment of the present invention.

As shown in FIG. 3, in the touch sensor portion 12, the first conductive layer 30 is formed on a front surface 20a of a substrate 20, and the second conductive layer 40 is formed on a rear surface 20b of the substrate 20. A protective layer 24 is provided on the first conductive layer 30 through an adhesive layer 22. The protective layer 24 is provided on the second conductive layer 40 through the adhesive layer 22.

The first wiring 32 is formed on the front surface 20a of the substrate 20 on which the first conductive layer 30 is formed, although the first wiring 32 is not shown in FIG. 3. Furthermore, the second wiring 42 is formed on the rear surface 20b of the substrate 20 on which the second conductive layer 40 is formed, although the second wiring 42 is not shown in FIG. 3.

By forming the first conductive layer 30 on the front surface 20a of a single substrate 20 and forming the second conductive layer 40 on the rear surface 20b, even though the substrate 20 contracts, it is possible to reduce the dislocation between the first conductive layer 30 and the second conductive layer 40 in the positional relationship thereof.

The touch sensor panel 10 may have a constitution in which one conductive layer is provided on a single substrate 20, for example. As in the touch sensor portion 12 shown in FIG. 4, a constitution may also be adopted in which on the rear surface 20b of a single substrate 20 with the front surface 20a on which the first conductive layer 30 is formed, a substrate 21 with a front surface 21a on which the second conductive layer 40 is formed through an adhesive layer 26 may be laminated. In this case, the protective layer 24 is provided on the first conductive layer 30 through the adhesive layer 22. The substrate 21 and the substrate 20 have the same constitution.

Figure 5:
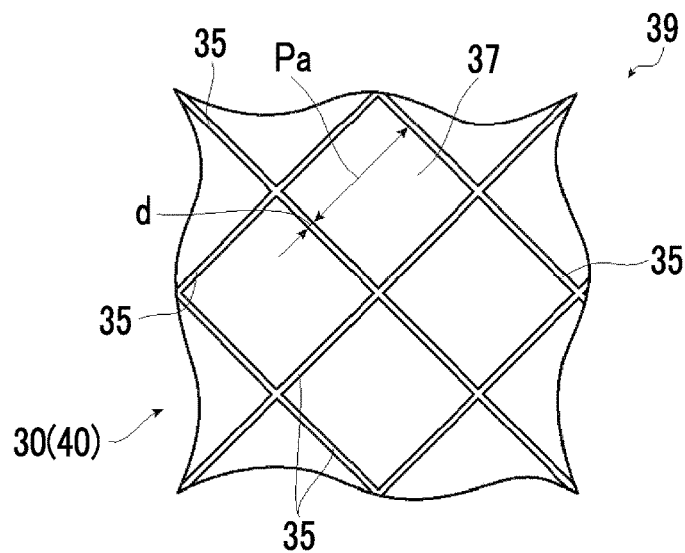
FIG. 5 is a plan view showing an example of a conductive pattern formed of conductive thin wires.

As shown in FIG. 5, the first conductive layer 30 and the second conductive layer 40 are each constituted with conductive thin wires 35.

A line width d of each conductive thin wire 35 is preferably equal to or greater than 0.1 μm and equal to or smaller than 5 μm, and more preferably equal to or greater than 0.5 μm and equal to or smaller than 4 μm. In a case where the line width d of the conductive thin wire 35 is within the above range, the resistance of the first conductive layer 30 and the second conductive layer 40 can be relatively easily lowered.

The thickness of each conductive thin wire 35 is not particularly limited, but is preferably 0.1 μm to 10 μm and most preferably 0.5 μm 5 μm. In a case where the thickness of each conductive thin wire 35 is within the above range, the first conductive layer 30 and the second conductive layer 40 having low resistance and excellent durability can be relatively easily obtained.

The line width d and the thickness of each conductive thin wire 35 can be measured using an optical microscope, a laser microscope, a digital microscope, and the like, for example.

In FIG. 2, the first conductive layer 30 and the second conductive layer 40 are both schematically shown in the form of a rod. However, as shown in FIG. 5, for example, the first conductive layer 30 and the second conductive layer 40 have a mesh pattern 39 obtained by combining a large number of cells 37 constituted with the conductive thin wires 35.

Each cell 37 has the shape of a polygon, for example. Examples of the polygon include a triangle, a quadrangle such as a square, a rectangle, a parallelogram, or a rhombus, a pentagon, a hexagon, a random polygon, and the like. Some of the sides constituting the polygon may be a curve.

In a case where a length Pa of one side of each cell 37 of the mesh pattern 39 is too small, an opening ratio and a transmittance are reduced, and this leads to a problem of the deterioration of transparency. In contrast, in a case where the length Pa of one side of each cell 37 is too large, the touch position is unlikely to be detected at high resolution.

The length Pa of one side of each cell 37 of the mesh pattern 39 is not particularly limited, but is preferably 50 to 500 μm and more preferably 100 to 400 μm. In a case where the length Pa of one side of each cell 37 is within the above range, the transparency can be kept excellently. In a case where such a mesh pattern is provided on the front surface of a display device, the display can be recognized without discomfort.

In view of visible light transmittance, the opening ratio of the mesh pattern 39 formed of the conductive thin wires 35 is preferably equal to or higher than 80%, more preferably equal to or higher than 85%, and most preferably equal to or higher than 90%. The opening ratio is a proportion of a light-transmitting portion in the entire pattern excluding the conductive thin wires 35.

By making the first conductive layer 30 and the second conductive layer 40 have a mesh structure in which the conductive thin wires 35 cross each other and form a mesh shape, the resistance can be reduced, and the wires are hardly broken. Furthermore, even in a case where wires are broken, it is possible to reduce the influence on the value of resistance of the detection electrode.

Regarding the mesh structure, the mesh shape may be either a regular shape in which the same patterns are regularly arrayed or a random shape. The regular shape is preferably a square shape, a rhombic shape, or a regular hexagonal shape, and particularly preferably a rhombic shape. For the rhombic shape, from the viewpoint of reducing moire with the display device, an acute angle of the rhombus is preferably 50° to 80°. The mesh pitch is preferably 50 μm to 500 μm, and the opening ratio of the mesh is preferably 82% to 99%. The opening ratio of the mesh is defined as the ratio of an area not being occupied by the conductive thin wires within the mesh portion.

As a mesh-like metal electrode, for example, it is possible to use the netlike mesh-type metal electrodes disclosed in JP2011-129501A, JP2013-149236A, and the like. In addition, for example, it is possible to appropriately use detection electrodes used in capacitance-type touch panels.

The length Pa of one side of each cell 37, the angle of the mesh, and the opening ratio of the mesh can be measured using an optical microscope, a laser microscope, a digital microscope, and the like, for example.

The thickness of the peripheral wiring portion 18b is not particularly limited, but preferably 0.1 µm to 0.2 mm and most preferably 0.5 µm to 35 µm. In a case where the thickness of the peripheral wiring portion 18b is within the above range, it is possible to relatively easily obtain the first wiring 32 and the second wiring 42 having low resistance and excellent durability.

Similarly to the conductive thin wire 35, the thickness of the peripheral wiring portion 18b can be measured using an optical microscope, a laser microscope, a digital microscope, and the like, for example.

The conductive thin wires 35, the peripheral wiring portion 18b, the transmission line portion 19, the antenna 16, and an antenna 80 which will be described later are constituted with a conductive material such as a metal, an alloy, or a compound. For the conductive thin wires 35, the peripheral wiring portion 18b, the transmission line portion 19, the antenna 16, and the antenna 80 which will be described later, the materials generally used as a conductor can be appropriately used, and the composition thereof is not particularly limited. The conductive thin wires 35, the peripheral wiring portion 18b, the transmission line portion 19, the antenna 16, and the antenna 80 which will be described later are formed of indium tin oxide (ITO), gold (Au), silver (Ag), copper (Cu), nickel (Ni), titanium (Ti), palladium (Pd), platinum (Pt), aluminum (Al), tungsten (W), or molybdenum (Mo), for example. An alloy of these may also be used. The conductive thin wire 35, the peripheral wiring portion 18b, the transmission line portion 19, the antenna 16, and the antenna 80 which will be described later may be constituted with gold (Au), silver (Ag), or copper (Cu) with a binder, and those constituted in this way are also included in the conductive thin wires 35, the peripheral wiring portion 18b, the transmission line portion 19, the antenna 16, and the antenna 80 which will be described later. By containing a binder, conductive thin wire 35, the peripheral wiring portion 18b, the transmission line portion 19, the antenna 16, and the antenna 80 which will be described later are easily subjected to a bending process and improved in terms of bending resistance. As the binder, those used as wiring of conductive films can be appropriately used, and for example, those described in JP2013-149236A can be used. In a case where the conductive thin wires 35 are constituted with a metal or an alloy, the conductive thin wires 35 are metal thin wires.

As the adhesive layer 22, for example, an optically transparent pressure sensitive adhesive called an optically clear adhesive (OCA) or an optically transparent resin such as an ultraviolet-curable resin called an optically clear resin (OCR) is used.

The protective layer 24 is for protecting the first conductive layer 30, the second conductive layer 40, the first wiring 32, the second wiring 42, the transmission line portion 19, the antenna 16, and the antenna 80 will be described later. The constitution of the protective layer 24 is not particularly limited, and for example, glass, polycarbonate (PC), polyethylene terephthalate (PET), an acrylic resin (PMMA), and the like can be used. Hereinafter, polyethylene terephthalate will be simply referred to as PET.

In the touch sensor panel 10, the antenna 16 is provided in a corner portion 12c (see FIG. 1) of the touch sensor portion 12.

The antenna 16 is a monopole antenna. The length of the antenna 16 is appropriately determined according to the wavelength of a radio wave used. The antenna 16 is constituted, for example, with a foil-like conductor having a constant width and is formed on the front surface 20a of the substrate 20. The foil-like conductor is a planar film called a solid film, for example. The antenna 16 can also be constituted with a mesh-like conductor. The antenna 16 is not limited to a monopole antenna, and antennas of various constitutions can be used according to the specification and the like.

The transmission line portion 19 connects the antenna 16 to the control board 14. On the substrate 20, the transmission line portion 19 starts from the corner portion 12c of the touch sensor portion 12, passes the outside of the first wiring 32, and reaches the wire connection region 12g in which the first wiring 32 and the second wiring 42 gather. The transmission line portion 19 is connected to the flexible printed circuits 15 at the end 12e of the touch sensor portion 12.

Figure 6:
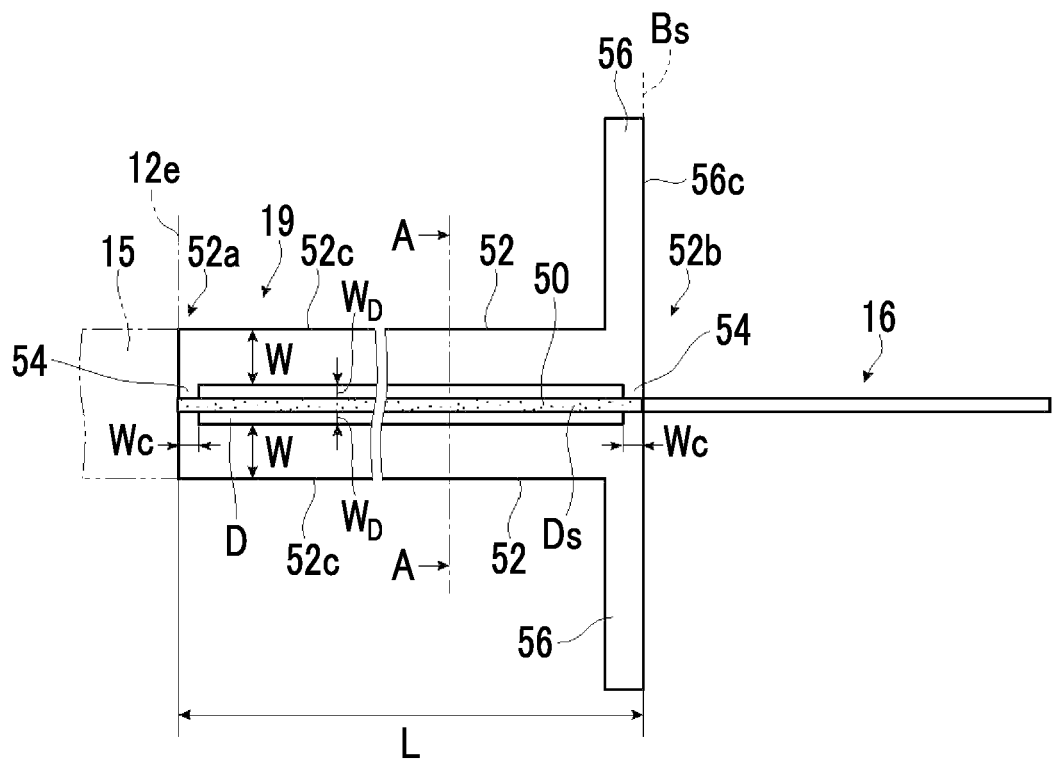
FIG. 6 is an enlarged view showing the main portions of an antenna and a transmission line of the touch sensor panel of the first embodiment of the present invention.
Figure 7:
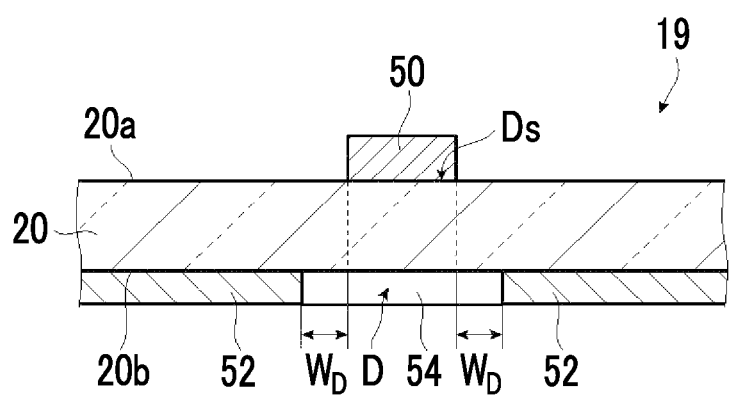
FIG. 7 is a cross-sectional view taken along the line A-A in FIG. 6.

FIG. 6 is an enlarged view showing the main portions of the antenna and the transmission line of the touch sensor panel of the first embodiment of the present invention. FIG. 7 is a cross-sectional view taken along the line A-A in FIG. 6.

As shown in FIG. 7, the transmission line portion 19 has a signal wire 50 provided on the front surface 20a of the substrate 20 and ground wires 52 provided on the rear surface 20b of the substrate 20. The signal wire 50 is connected to the antenna 16 formed on the front surface 20a of the substrate 20. The antenna 16 and the signal wire 50 may be integrally constituted.

The ground wires 52 are grounded within the control board 14 although the grounding state is not shown in the drawing. Within the rear surface 20b of the substrate 20, two ground wires 52 are provided across a disposition region D corresponding to a region Ds of the front surface 20a of the substrate 20 provided with the signal wire 50. As shown in FIG. 6, at the end 12e of the touch sensor portion 12, ends 52a of the two ground wires 52 are electrically connected to each other by a connection portion 54. Furthermore, ends 52b of the two ground wires 52 on the antenna 16 side are electrically connected to each other by the connection portion 54. The disposition region D is a region surrounded by the ground wires 52 and the connection portions 54.

In a case where the two ground wires 52 are in a state of being electrically connected to each other within the flexible printed circuits 15 of the upstream, the connection portion 54 at the end 12e of the touch sensor portion 12 that electrically connect the two ground wires 52 may not be provided.

The two ground wires 52 do not have to be provided on the rear surface 20b of the substrate 20, and may be provided on the front surface 20a of the substrate 20. In this case, the signal wire 50 and the antenna 16 are provided on the rear surface 20b of the substrate 20.

A virtual ground wire 56 extending in a direction orthogonal to the length direction of the ground wires 52 is provided on a lateral surface 52c of the end 52b of each of the ground wires 52 on the antenna 16 side. An end face 56c of the virtual ground wire 56 becomes a virtual ground plane Bs.

A ground wire length L of the transmission line portion 19 the length between both ends of the transmission line portion 19 and corresponds to the length between an end 52a on the end 12e side of the touch sensor portion 12 and the end 52b.

In FIG. 6, the ground wire length L is the length between the end 52a on the end 12e side of the touch sensor portion 12 and the end face 56c of the virtual ground wire 56.

A width W of each ground wire 52 is a length in a direction along which the connection portions 54 face each other, and does not include the connection portions 54.

Considering the influence on the characteristic impedance of the transmission line portion, a connection width We of each connection portion 54 is preferably 10 μm to 10 mm, more preferably 100 μm to 5 mm, and most preferably 100 μm to 1 mm.

The transmission line portion 19 has a constitution in which the signal wire 50 is provided on the front surface 20a of the substrate 20, and the ground wires 52 are provided on the rear surface 20b of the substrate 20. However, the present invention is not limited thereto. The signal wire 50 may be provided on the rear surface 20b of the 20, and the ground wires 52 may be provided on the front surface 20a of the substrate 20. In this case, the antenna 16 is provided on the rear surface 20b, on the same side as the signal wire 50. The front surface 20a and the rear surface 20b of the substrate 20 correspond to one surface and the other surface respectively.

The signal wire 50 and the ground wires 52 are constituted with a foil-like conductor, for example. The signal wire 50 and the ground wires 52 can also be constituted with a mesh-like conductor.

By constituting the transmission line portion 19 as shown in FIGS. 6 and 7, the transmission line portion 19 can be provided together with the antenna 16 on the substrate 20 of the touch sensor portion 12.

The signal wire 50 and the ground wires 52 of the transmission line portion 19 may have the same thickness as the peripheral wiring portion 18b. That is, the first wiring 32 and the second wiring 42 of the touch sensor portion 12 may have the same thickness. Furthermore, the signal wire 50 of the transmission line portion 19 formed on the same surface of the substrate 20 may have the same thickness as the antenna 16. It is preferable that the first wiring 32 and the second wiring 42 of the touch sensor portion 12, the signal wire 50 and the ground wires 52 of the transmission line portion 19, and the conductive portion of the antenna 16 have the same thickness. In addition, it is preferable that the first wiring 32 and the second wiring 42 of the touch sensor portion 12, the signal wire 50 and the ground wires 52 of the transmission line portion 19, and the conductive portion of the antenna 16 have a low sheet resistance.

For the transmission line portion 19, characteristic impedance matching and a transmission loss need to be considered. In the transmission line portion 19, a width Ws of the signal wire 50, the width W of each ground wire 52, and an interwire distance $W_D$ between the signal wire 50 and each ground wire 52 are set such that the impedance thereof is matched with the characteristic impedance preset using a dielectric constant and a thickness of each of the substrate 20, the adhesive layer 22, and the protective layer 24.

Figure 8:
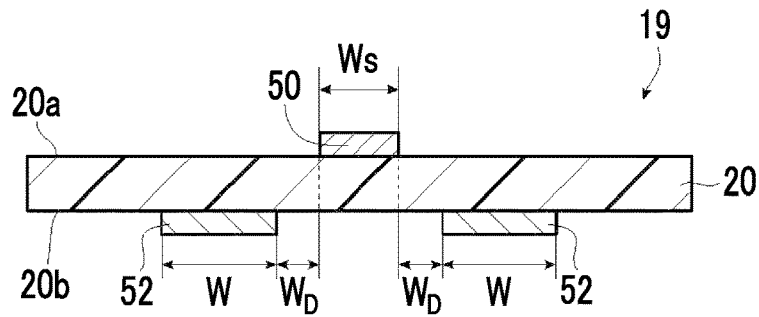
FIG. 8 is a schematic cross-sectional view showing a transmission line.

In order to reduce the transmission loss in the transmission line portion 19, a material with a low sheet resistance is used. For example, while a copper foil with a thickness of 35 μm has a sheet resistance of about 0.45 mΩ/sq., the peripheral wiring portion 18b of the touch sensor portion 12 has a high sheet resistance which is about 0.1 Ω/sq. Accordingly, a transmission line structure is used which is optimal for reducing the transmission loss that occurs in a case where the same material as the peripheral wiring portion 18b is used for the transmission line portion. FIG. 8 shows the transmission line portion 19.

Figure 9:
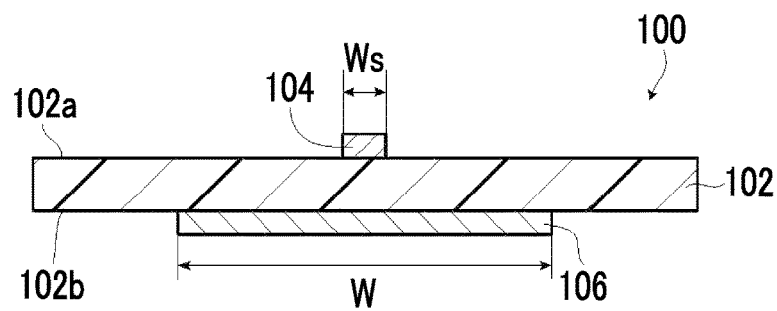
FIG. 9 is a schematic cross-sectional view showing a transmission line of the related art.

FIG. 9 shows a transmission line portion 100 having a microstrip line structure that is generally known as the structure of a transmission line. In the transmission line portion 100, a signal wire 104 is formed on a front surface 102a of a substrate 102, and a ground wire 106 is formed on a rear surface 102b of the substrate 102.

Figure 10:
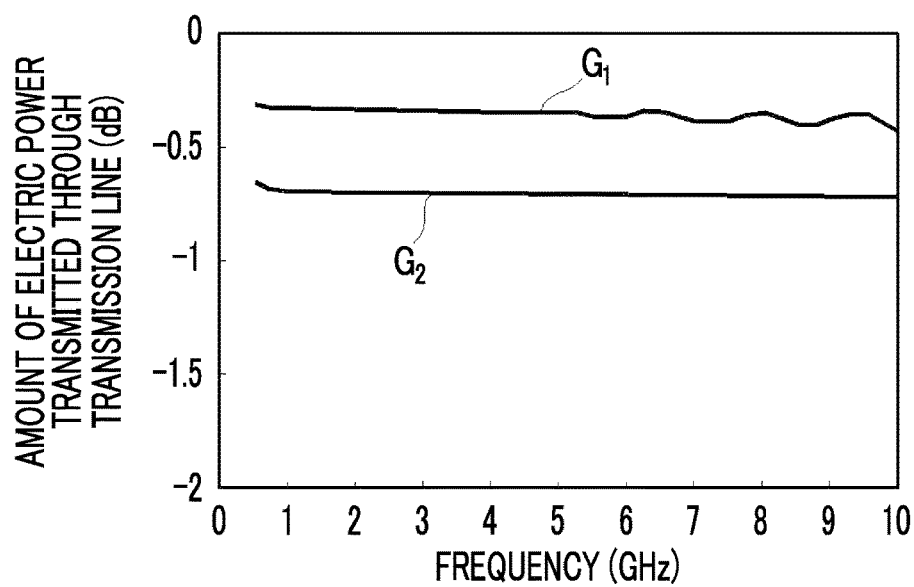
FIG. 10 is a graph for illustrating a transmission loss of a transmission line portion.

In a case where a PET material having a thickness of 100 μm is used as the substrate 20 in the transmission line portion 19 shown in FIG. 8 and in the transmission line portion 100 shown in FIG. 9, for a characteristic impedance of 50Ω, while the width Ws and the interwire distance $W_D$ of the signal wire 50 are 600 μm and 140 μm respectively in the transmission line portion 19 shown in FIG. 8, the width Ws of the signal wire 104 is 160 μm in the transmission line portion 100 shown in FIG. 9. Even though the frequency is changed as shown in FIG. 10, in a case where the width Ws of the signal wire 50 is 600 μm (see the reference $G_1$), the amount of electric power transferred through the transmission line portion is larger, and the transmission loss of the transmission line portion is smaller, than in a case where the width Ws of the signal wire 104 is 160 μm (see the reference $G_2$). The graph shown in FIG. 10 that is for illustrating the transmission loss of the transmission line portion is obtained by using a PET material having a thickness of 100 μm as a substrate, under the conditions in which the length of the transmission line portion is 50 mm, the width Ws of the signal wire 104 is 160 μm, the width Ws of the signal wire 50 is 600 μm, the width W of the ground wire 52 and the ground wire 106 is 1,000 μm, the interwire distance $W_D$ is 140 μm, the sheet resistance of the signal wire is 0.1 Ω/sq., and the characteristic impedance of an input and output portion is 50Ω.

As described above, in the transmission line portion 19, the width Ws of the signal wire 50 can be broadened further than in the transmission line portion 100 having the general structure of a transmission line. As a result, in the transmission line portion 19, a resistive loss can be further reduced because the resistance of the signal wire 50 can be lowered, and the transmission loss can be further reduced, than in the general structure of a transmission line.

Considering the fact that the maximum length of the transmission line portion 19 provided in the touch sensor panel 10 is about 1 m, the sheet resistance acceptable in this case is desirably about equal to or lower than 10 Ω/sq. Particularly, the sheet resistance at which the effect that the aforementioned structure brings about is obtained is 0.01 to 10 Ω/sq. The sheet resistance is most preferably 0.01 to 1 Ω/sq.

The sheet resistance is determined by cutting a transmission line to be measured in a width of 10 mm, bonding a conductive copper tape to both ends thereof such that the transmission line portion has a length of 10 mm, and measuring the resistance of the both ends by using 34405A MULTIMETER manufactured by Agilent Technologies. The measured value of resistance is a sheet resistance. For the peripheral wiring portion 18b, the peripheral wiring portion 18b is cut in a width of 10 mm, and the resistance of both ends thereof is measured as described. The measured value of resistance is a sheet resistance.

The characteristic impedance of the antenna 16 is designed such that it is matched with the characteristic impedance of the transmission line portion 19. However, due to the disposition environment of the antenna, the restriction on the shape of the antenna, the manufacturing variation, and the like, it is difficult to satisfy appropriate matching conditions for all the products.

Accordingly, in some cases, the characteristic impedance matching is not accomplished between the transmission line portion 19 and the antenna 16. Furthermore, in a case where the wavelength in the transmission line portion 19 becomes $\lambda/2$, $3\lambda/2$, $5\lambda/2$, and the like with respect to a wavelength $\lambda$ of the radio wave used by the antenna 16 due to the combination of the ground wire length L of the transmission line portion 19 and the width W of the ground wire 52, sometimes resonance occurs in the transmission line portion 19, and the transmission line portion 19 loses its function as a transmission line. Therefore, in order to avoid the resonance phenomenon in the transmission line portion 19, the length in the combination of the ground wire length L and the width W of the ground wire 52 is made different from the specific ratio with respect to the aforementioned wavelength $\lambda$.

In this way, in the transmission line portion 19, the resonance phenomenon can be avoided, and the resistive loss as well as the transmission loss can be reduced.

Hereinafter, the constitution for avoiding the resonance phenomenon in the transmission line portion 19 will be specifically described.

Figure 11:
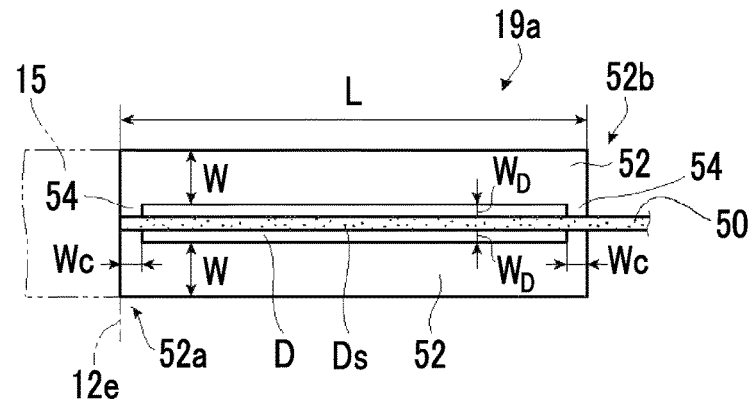
FIG. 11 is a schematic view showing a first example of a transmission line.
Figure 12:
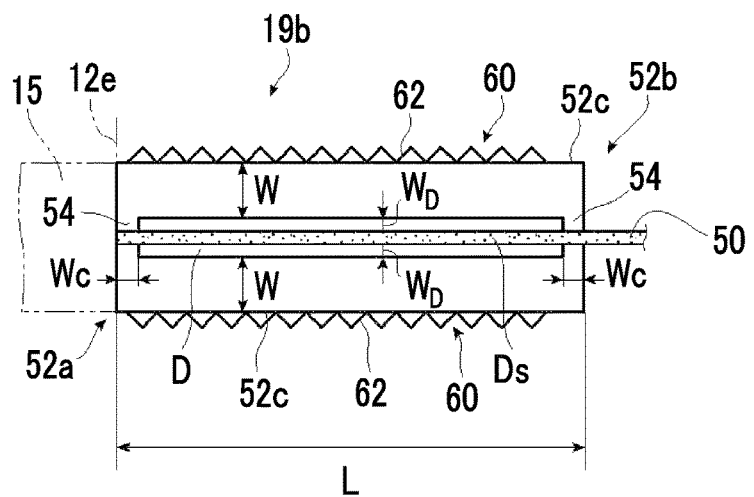
FIG. 12 is a schematic view showing a second example of a transmission line.
Figure 13:
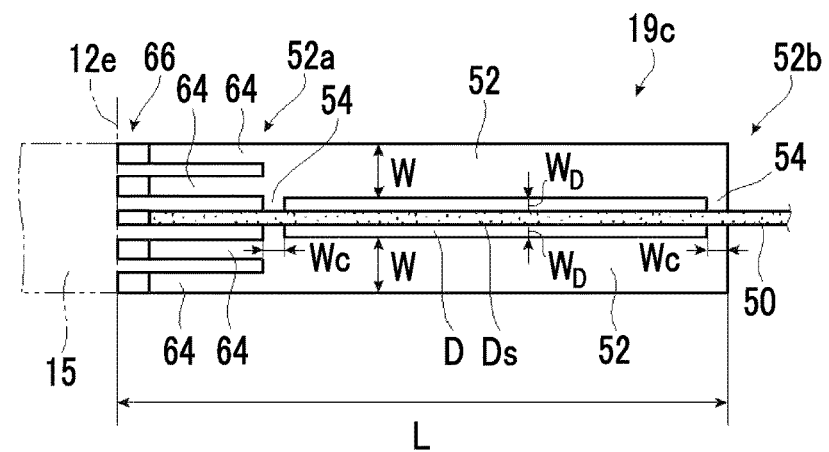
FIG. 13 is a schematic view showing a third example of a transmission line.

FIG. 11 is a schematic view showing a first example of a transmission line. FIG. 12 is a schematic view showing a second example of a transmission line. FIG. 13 is a schematic view showing a third example of a transmission line.

In a transmission line portion 19*a* shown in FIG. 11, a transmission line portion 19*b* shown in FIG. 12, and a transmission line portion 19*c* shown in FIG. 13, the same constituents as in the transmission line portion 19 shown in FIGS. 6 and 7 are marked with the same reference, and the detailed description thereof will not be repeated.

All of the transmission line portion 19*a* shown in FIG. 11, the transmission line portion 19*b* shown in FIG. 12, and the transmission line portion 19*c* shown in FIG. 13 are connected to an antenna, although the antenna is not shown in the drawings.

In the transmission line portion 19*a* shown in FIG. 11, in order to avoid the resonance phenomenon in transmission line portion 19*a*, the width W of the ground wire 52 and the ground wire length L are optimized. Specifically, as described above the ground wire length L is made different from the specific ratio with respect to the wavelength $\lambda$ of the radio wave used by the antenna 16. Furthermore, by changing the width W of the ground wire 52, the resonance phenomenon can also be avoided. The width W of the ground wire 52 and the ground wire length L are optimized based on the wavelength $\lambda$ of the radio wave used by the antenna 16. It goes without saying that, in the transmission line portion 19*a*, the width Ws of the signal wire 50, the width W of each ground wire 52, and the interwire distance $W_D$ between the signal wire 50 and each ground wire 52 are set such that impedance of the transmission line portion 19*a* is matched with the preset characteristic impedance. The ground wire length L of the transmission line portion 19*a* is the length between the end 52*a* of the touch sensor portion 12 on the end 12*e* side and the end 52*b*.

In order to avoid the resonance phenomenon in a transmission line portion, the constitution of the transmission line portion 19*b* shown in FIG. 12 can also be adopted. In the transmission line portion 19*b*, on the lateral surface 52*c* of each of the ground wires 52, an anti-resonance wire 60 constituted with a conductive wire 62 is provided in a wavy pattern. The conductive wire 62 is electrically connected to each of the ground wires 52 provided on the rear surface 20*b* of the substrate 20. The anti-resonance wire 60 is an auxiliary transmission line forming a transmission line different from the ground wires 52. Due to the anti-resonance wire 60, even though the transmission line portion 19*b* has a ground wire length L at which the resonance occurs, because the conductive wire 62 of the anti-resonance wire 60 is electrically connected to each of the ground wires 52, the ground wire length L is substantially increased, and hence the resonance phenomenon can be avoided. It goes without saying that, in the transmission line portion 19*b*, the width Ws of the signal wire 50, the width W of each ground wire 52, and the interwire distance $W_D$ between the signal wire 50 and each ground wire 52 are set such that the impedance of the transmission line portion 19*b* is matched with the preset characteristic impedance.

The pattern of the conductive wire 62 of the anti-resonance wire 60 is not particularly limited. For example, based on the wavelength $\lambda$ of the used radio wave and the ground wire length L of the transmission line portion 19*b*, the length of the conductive wire 62 is determined. The pattern is determined such that the conductive wire 62 having the determined length is disposed on the lateral surface 52*c* of each ground wire 52. Accordingly, the conductive wire 62 does not have to be disposed within the entire region of the lateral surface 52*c* of each ground wire 52. Each ground wire 52 and the conductive wire 62 may be integrally formed or separately formed.

The line width of the conductive wire 62 of the anti-resonance wire 60 is preferably 1 μm to 500 μm and most desirably 10 μm to 200 μm, lest the characteristic impedance of the transmission line portion 19*b* is affected.

In order to avoid the resonance phenomenon in the transmission line portion, the constitution of the transmission line portion 19*c* shown in FIG. 13 can also be adopted. In the transmission line portion 19*c*, at the end 52*a* of each ground wire 52, for example, two connection terminals 64 are provided. At the end 12*e* of the touch sensor portion 12, the connection terminals 64 are connected to each other by the flexible printed circuits 15 and the connection portion 66. In the transmission line portion 19*c*, the connection terminals 64 are combined to satisfy the condition under which the resonance does not occur in the transmission line portion, and only the selected connection terminals 64 are connected to each other by the flexible printed circuits 15 and the connection portion 66. In this case, provided that there are two connection terminals 64, the number of combinations thereof is 4.

Although each ground wire 52 is provided with two connection terminals 64, the number of connection terminals 64 is not particularly limited. However, because the connection terminals 64 are provided to avoid the occurrence of resonance in the transmission line portion, in order to increase the number of combinations of connection for avoiding the occurrence of resonance in the transmission line portion, it is preferable to provide a plurality of connection terminals 64.

It goes without saying that, in the transmission line portion 19*c*, the width Ws of the signal wire 50, the width W of each ground wire 52, and the interwire distance $W_D$ between the signal wire 50 and each ground wire 52 are set such that the impedance of the transmission line portion 19*c* is matched with the preset characteristic impedance. The ground wire length L of the transmission line portion 19*c* is a length between the connection portion 66 of the connection terminals 64 on the end 12*e* side of the touch sensor portion 12 and the end 52*b*.

In the touch sensor panel 10, as described above, the transmission line portion 19 can avoid the resonance phenomenon and causes only a small transmission loss. Therefore, even in a case where the transmission line portion 19 is provided, the resonance phenomenon in the transmission line portion can be avoided, and the transmission loss can be reduced. Accordingly, a degree of freedom of the disposition position of the antenna 16 can be heightened, and a degree of freedom of the specification or the design of a mobile terminal apparatus using the touch sensor panel 10 having the antenna 16 can be heightened. Furthermore, the amount of electric power consumed during the communication performed through the antenna 16 can be reduced. In a case where the touch sensor panel 10 is used in a mobile terminal apparatus, the touch sensor panel 10 can contribute to the extension of the life of an internal battery and the reduction in the capacity of an internal battery. The aforementioned transmission line portion 19 can also contribute to the compactification of a mobile terminal apparatus.

The method for forming the first conductive layer 30, the first wiring 32, the second conductive layer 40, the second wiring 42, the antenna 16, and the transmission line portion 19 is not particularly limited. For example, a wiring formation method using a plating method may be used. In the plating method, only electroless plating may be performed, or, electrolytic plating may be performed after electroless plating. The wiring formation method using a plating method may be a subtractive method, a semi-additive method, or a full additive method. Furthermore, the first conductive layer 30, the first wiring 32, the second conductive layer 40, the second wiring 42, the antenna 16, and the transmission line portion 19 can be formed by performing exposure on a photosensitive material having an emulsion layer containing a photosensitive silver halide salt and performing a development treatment. In addition, by forming metal foil on the substrate 20, printing a resist patternwise on each metal foil or performing exposure on a resist applied onto the entire surface of the substrate, performing development to form a pattern, and etching the metal in the opening portion, the first conductive layer 30, the first wiring 32, the second conductive layer 40, the second wiring 42, the antenna 16, and the transmission line portion 19 can be formed. Examples of other formation methods include a method of performing printing by using a paste containing fine particles of the material constituting the aforementioned conductors and plating the paste with a metal and a method of using an ink jet method in which ink containing fine particles of the material constituting the aforementioned conductors is used.

The first conductive layer 30, the first wiring 32, the antenna 16, and the signal wire 50 of the transmission line portion 19 are formed on the same surface. In a case where the first conductive layer 30 and the first wiring 32 are formed through exposure, by using an exposure pattern as a pattern for each portion, the first conductive layer 30, the first wiring 32, the antenna 16, and the signal wire 50 of the transmission line portion 19 can be collectively formed. In this way, the manufacturing process can be simplified, and the manufacturing costs can be reduced. In addition, the first conductive layer 30, the first wiring 32, the antenna 16, and the signal wire 50 of the transmission line portion 19 can be formed of the same material and formed at the same thickness.

Furthermore, in a case where the first conductive layer 30 and the first wiring 32 as well as the second conductive layer 40 and the first wiring 32 are formed by simultaneously performing exposure on both surfaces of the substrate 20, the second conductive layer 40 and the ground wires 52 of the transmission line portion 19 can also be collectively formed. Accordingly, the production efficiency can be further improved, and the manufacturing costs can be further reduced. Moreover, the first conductive layer 30, the first wiring 32, the second conductive layer 40, the first wiring 32, and the transmission line portion 19 can be formed at the same thickness.

Herein, the same material means that the type and content of the compositional components are identical. "Identical" means that the type of the compositional components is the same. For the content, "identical" means that a margin of error of ±10% is acceptable. Furthermore, for example, in a case where the first conductive layer 30, the first wiring 32, the second conductive layer 40, the first wiring 32, and the transmission line portion 19 are formed of the same material through the same step, it is said that they are formed of the same material. The composition and content can be measured using an X-ray fluorescence analyzer, for example.

It goes without saying that all of the transmission line portion 19, the sensor portion 18a, and the peripheral wiring portion 18b do not have to be formed of the same material, and can be formed of different materials at different thicknesses.

Next, a second embodiment of the touch sensor panel will be described.

Figure 14:
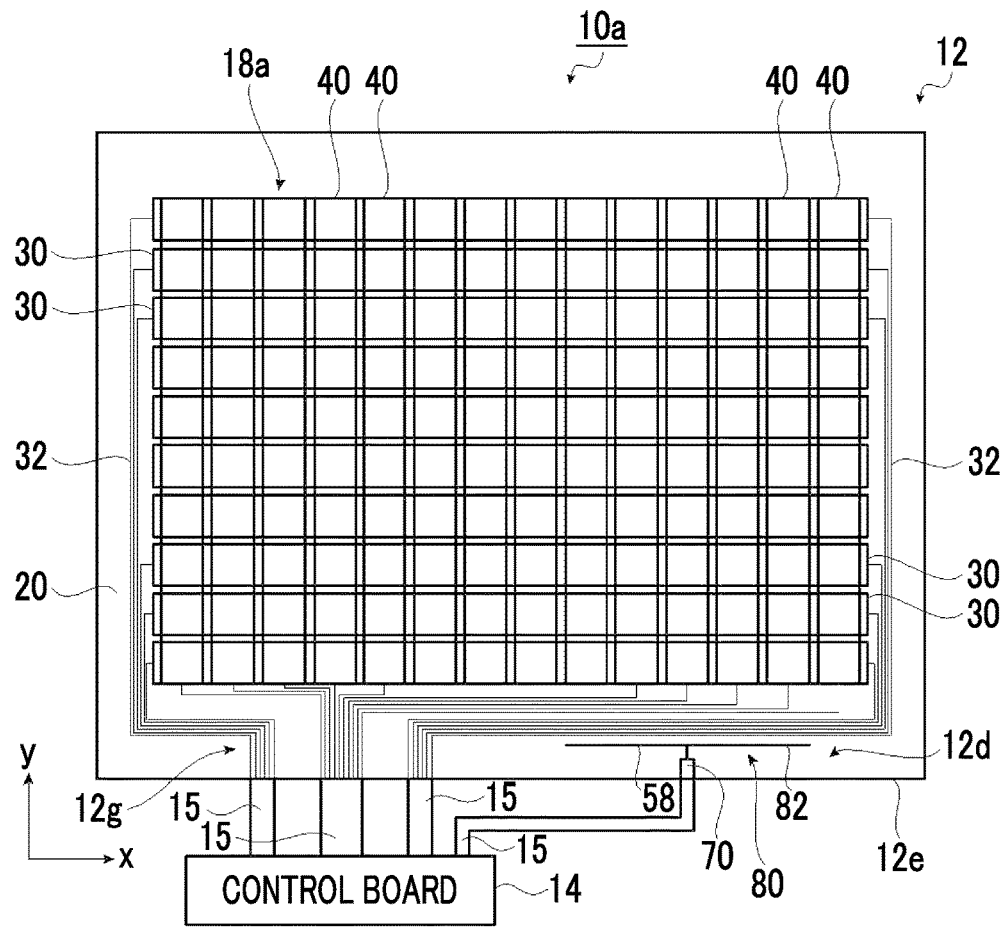
FIG. 14 is a schematic plan view showing a touch sensor panel of a second embodiment of the present invention.
Figure 15:
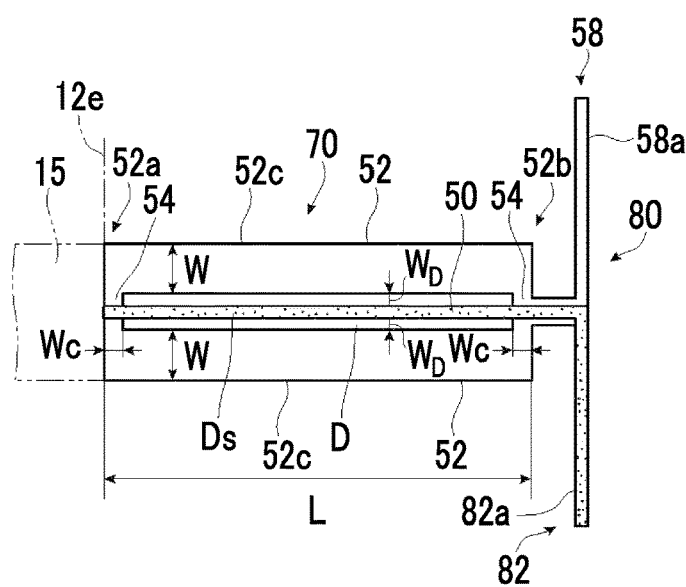
FIG. 15 is an enlarged view showing the main portion of an antenna and a transmission line of the touch sensor panel of the second embodiment of the present invention.

FIG. 14 is a schematic plan view showing a touch sensor panel of the second embodiment of the present invention. FIG. 15 is an enlarged view showing the main portions of an antenna and a transmission line of the touch sensor panel of the second embodiment of the present invention.

Figure 4:
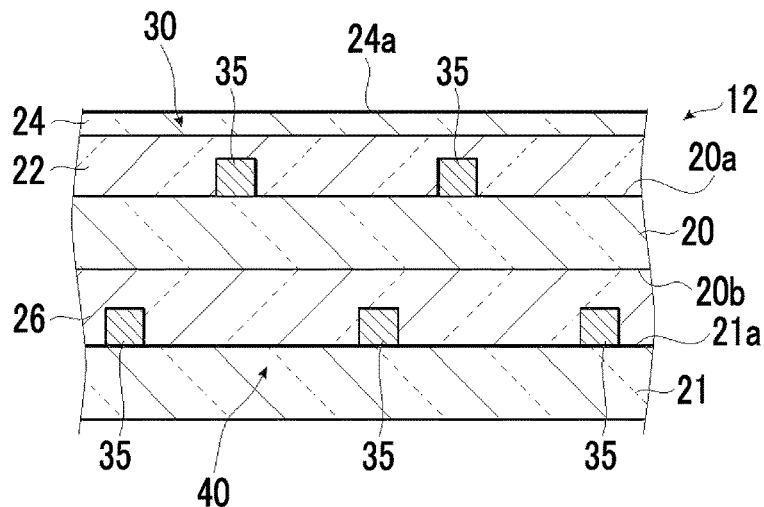
FIG. 4 is a schematic cross-sectional view showing another example of the touch sensor panel of the first embodiment of the present invention.

In FIGS. 14 and 15, the same constituents as the touch sensor panel 10 of the first embodiment shown in FIGS. 1 and 2, the touch sensor portion 12 of the first embodiment shown in FIGS. 3 to 5, and the transmission line portion 19 shown in FIGS. 6 and 7 will be marked with the same references, and the detailed description thereof will not be repeated. In FIG. 14, for some of the first conductive layers 30, the first wiring 32 connected thereto is not shown. Furthermore, for some of the second conductive layers 40, the second wiring 42 connected thereto is not shown in the drawing.

A touch sensor panel 10a of the present embodiment shown in FIG. 14 has the same constitution as the touch sensor panel 10 (see FIG. 2) of the first embodiment, except that the disposition position and the constitution of the antenna 80 as well as the constitution of a transmission line portion 70 are different from those in the touch sensor panel 10 (see FIG. 2) of the first embodiment. Therefore, the detailed description of the constitution of the touch sensor panel 10a will not be repeated.

As shown in FIG. 14, the antenna 80 in the touch sensor panel 10a is a dipole antenna. Furthermore, the antenna 80 is disposed between the first wiring 32 and the end 12e of the touch sensor portion 12.

As shown in FIG. 15, in the transmission line portion 70, while the virtual ground wire 56 is not provided on the lateral surface 52c, an L-shaped ground conductor 58 is provided in the connection portion 54 at the end 52b. The ground conductor 58 is formed on the rear surface 20b of the substrate 20. The signal wire 50 is connected to a conductor 82 which is L-shaped just like the ground conductor 58. The ground conductor 58 and the conductor 82 have the same shape and size, and a long side portion 58a of the ground conductor 58 and a long side portion 82a of the conductor 82 are disposed on the same straight line. The dipole antenna is constituted with the ground conductor 58 and the conductor 82. The length and width of the antenna 80 are appropriately determined according to the wavelength of the radio wave used.

The portion where the ground conductor 58 and the conductor 82 overlap each other may have a microstrip line structure.

In the transmission line portion 70, the width Ws (see FIG. 8) of the signal wire 50 can be made wider than in a microstrip line structure, and the resistive loss can be reduced. In addition, as in the aforementioned transmission line portion 19a shown in FIG. 11, by optimizing the width W of each ground wire 52 and the ground wire length L, the resonance phenomenon in the transmission line portion may be avoided.

Furthermore, as in the aforementioned transmission line portion 19b shown in FIG. 12, by providing the anti-resonance wire 60 constituted with the conductive wire 62 on the lateral surface 52c of each ground wire 52, the resonance phenomenon in the transmission line portion may be avoided. Moreover, as in the transmission line portion 19c shown in FIG. 13, by adopting a constitution in which a plurality of connection terminals 64 are provided at the end 52a of each ground wire 52 and changing the combination of the connection between the connection terminals 64, the resonance phenomenon in the transmission line portion may be avoided.

From the touch sensor panel 10a, the same effect as obtained from the touch sensor panel 10 of the first embodiment can be obtained.

Next, a third embodiment of the touch sensor panel will be described.

Figure 16:
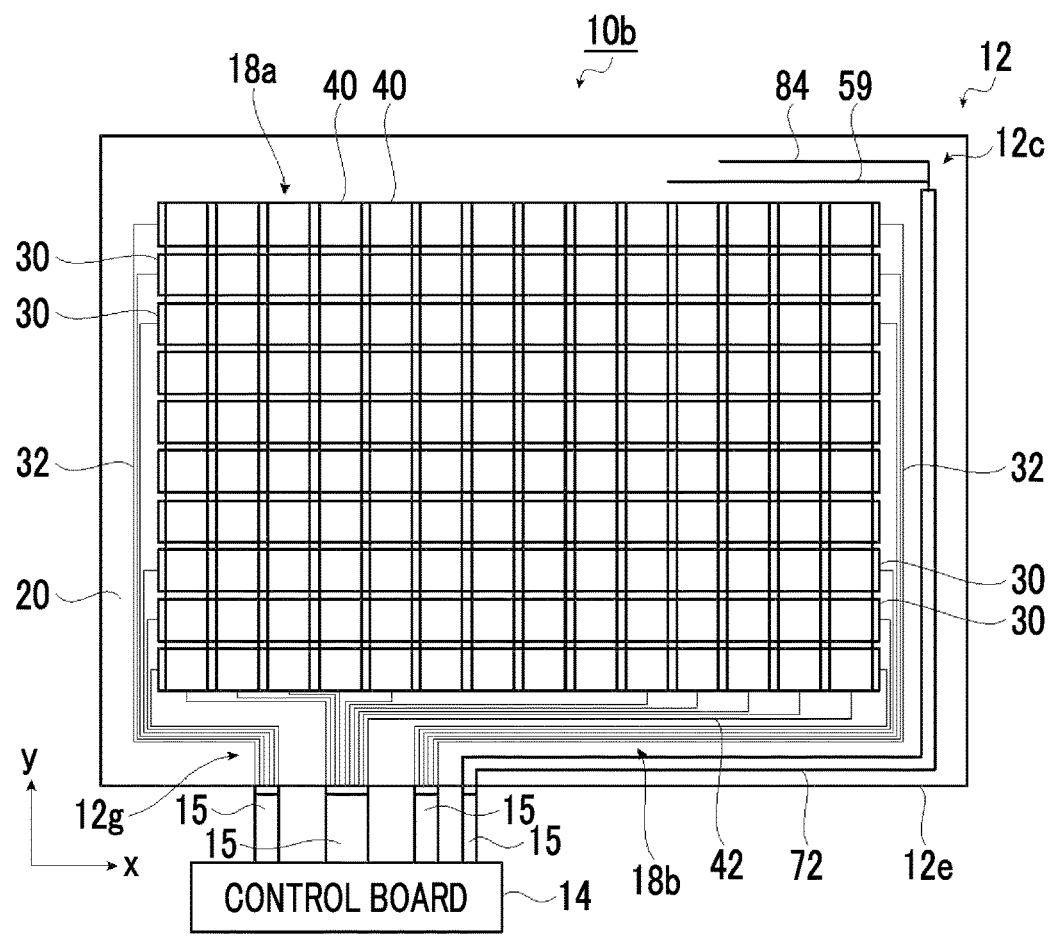
FIG. 16 is a schematic plan view showing a touch sensor panel of a third embodiment of the present invention.
Figure 17:
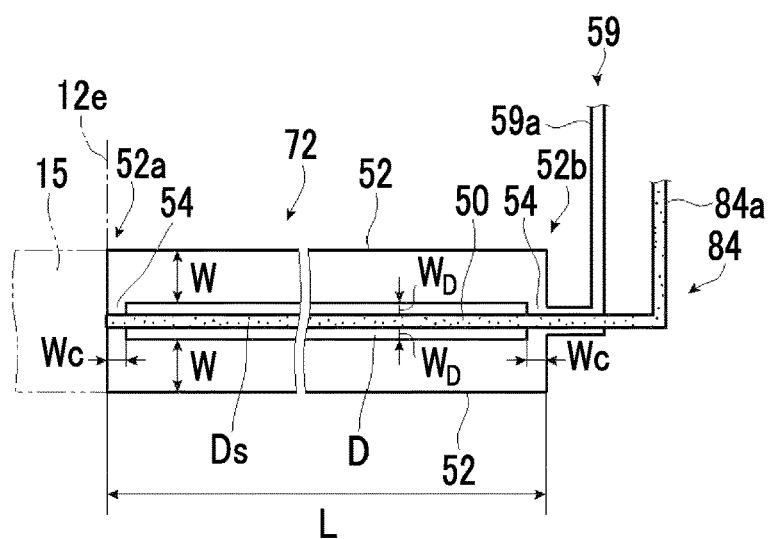
FIG. 17 is an enlarged view showing the main portions of an antenna and a transmission line of the touch sensor panel of the third embodiment of the present invention.

FIG. 16 is a schematic plan view showing a touch sensor panel of the third embodiment of the present invention. FIG. 17 is an enlarged view showing the main portions of an antenna and a transmission line of the touch sensor panel of the third embodiment of the present invention.

In FIGS. 16 and 17, the same constituents as the touch sensor panel 10 of the first embodiment shown in FIGS. 1 and 2, the touch sensor portion 12 of the first embodiment shown in FIGS. 3 to 5, and the transmission line portion 19 shown in FIGS. 6 and 7 are marked with the same references, and the detailed description thereof will not be repeated. In FIG. 16, for some of the first conductive layers 30, the first wiring 32 connected thereto is not shown. Furthermore, for some of the second conductive layers 40, the second wiring 42 connected thereto is not shown in the drawing.

A touch sensor panel 10b of the present embodiment shown in FIG. 16 has the same constitution as the touch sensor panel 10 (see FIG. 2) of the first embodiment, except that unlike in the touch sensor panel 10 (see FIG. 2) of the first embodiment, an inverted L-shaped antenna 84 is used, and a transmission line portion 72 has a different constitution. Therefore, the detailed description of the constitution of the touch sensor panel 10b will not be repeated.

As shown in FIG. 16, in the touch sensor panel 10b, the inverted L-shaped antenna 84 is provided in the corner portion 12c of the touch sensor portion 12.

As shown in FIG. 17, in the transmission line portion 72, while the virtual ground wire 56 is not provided on the lateral surface 52c, an L-shaped ground conductor 59 is provided in the connection portion 54 at the end 52b. The ground conductor 59 is formed on the rear surface 20b of the substrate 20. The signal wire 50 is connected to the inverted L-shaped antenna 84. The inverted L-shaped antenna 84 is formed on the front surface 20a of the substrate 20 just like the aforementioned antenna 16, and is constituted with a foil-like conductor or a mesh-like conductor.

Although the ground conductor 59 and the inverted L-shaped antenna 84 have the same shape, a long side portion 59a of the ground conductor 59 is longer. The long side portion 59a of the ground conductor 59 and a long side portion 84a of the inverted L-shaped antenna 84 are disposed parallel to each other. The length and width of the long side portion 84a of the inverted L-shaped antenna 84 are appropriately determined according to the wavelength of the radio wave used. The length of the long side portion 59a of the ground conductor 59 is also appropriately determined according to the length of the long side portion 84a of the inverted L-shaped antenna 84.

Similarly to the virtual ground wire 56 shown in FIG. 6, the L-shaped ground conductor 59 may be a linear ground conductor provided on the lateral surface 52c.

The portion where the ground conductor 59 and the inverted L-shaped antenna 84 overlap each other may have a microstrip line structure.

In the transmission line portion 72, the width Ws (see FIG. 8) of the signal wire 50 can be made wider than in a microstrip line structure, and the resistive loss can be reduced. Furthermore, by optimizing the width W of each ground wire 52 and the ground wire length L as in the aforementioned transmission line portion 19a shown in FIG. 11, the resonance phenomenon in the transmission line portion may be avoided.

Furthermore, as in the aforementioned transmission line portion 19b shown in FIG. 12, by providing the anti-resonance wire 60 constituted with the conductive wire 62 on the lateral surface 52c of each ground wire 52, the resonance phenomenon in the transmission line portion may be avoided. As in the aforementioned transmission line portion 19c shown in FIG. 13, by adopting the constitution in which a plurality of connection terminals 64 are provided at the end 52a of each ground wire 52 and changing the combination of the connection between the connection terminals 64, the resonance phenomenon in the transmission line portion may be avoided.

From the touch sensor panel 10b, the same effect as obtained from the touch sensor panel 10 of the first embodiment can also be obtained.

Hereinafter, the method for manufacturing a touch sensor panel will be described.

In the above section, touch sensor panels were described using various examples. Hereinbelow, as a typical example, the touch sensor panel 10 shown in FIG. 2 will be described. As described above, in the touch sensor panel 10, the antenna and the transmission line portion are formed on the same surface as the second conductive layer 40 and the second wiring 42. At the time of forming the second conductive layer 40 and the second wiring 42 on the front surface 20a of the substrate 20, the antenna 16 and the transmission line portion 19 can also be formed by the same step by using the same material such as copper. Therefore, the method for manufacturing the touch sensor panel 10 that will be described below can also be applied to the method for manufacturing the antenna 16 and the transmission line portion 19.

As the method for manufacturing the touch sensor panel 10, for example, a photosensitive layer to be plated may be formed on the substrate 20 by using a pretreatment material for plating, and then exposure and a development treatment may be performed, followed by a plating treatment. By forming a metal portion and a light-transmitting portion in an exposed portion and an unexposed portion in the manner described above, the first conductive layer 30, the first wiring 32, the second conductive layer 40, and the second wiring 42 may be formed. Herein, by additionally performing at least any one of physical development and a plating treatment on the metal portion, a conductive metal may be supported on the metal portion.

As more preferred aspects of the method using the pretreatment material for plating, the following two aspects can be exemplified. The following aspects are more specifically described in JP2003-213437A, JP2006-64923A, JP2006-58797A, JP2006-135271A, and the like.

(a) Aspect in which the substrate 20 is coated with a layer to be plated containing a functional group interacting with a plating catalyst or a precursor thereof, followed by exposure and development, and then a plating treatment is performed such that a metal portion is formed on a material to be plated.

(b) Aspect in which an undercoat layer containing a polymer and a metal oxide and a layer to be plated containing a functional group interacting with a plating catalyst or a precursor thereof are laminated in this order on the substrate 20, followed by exposure or development, and then a plating treatment is performed such that a metal portion is formed on a material to be plated.

Alternatively, by performing exposure on a photosensitive material, in which an emulsion layer containing a photosensitive silver halide salt is on the substrate 20, and performing a development treatment such that a metal portion and a light-transmitting portion are formed in an exposed portion and an unexposed portion, the first conductive layer 30, the first wiring 32, the second conductive layer 40, and the second wiring 42 may be formed. Herein, by additionally performing at least any one of physical development and a plating treatment on the metal portion, a conductive metal may be supported on the metal portion.

As another method, by performing exposure and a development treatment on a photoresist film on a metal foil formed on the substrate 20 so as to form a resist pattern and etching the metal foil exposed from the resist pattern, the first conductive layer 30, the first wiring 32, the second conductive layer 40 and the second wiring 42 may be formed.

Alternatively, by printing a paste containing metal fine particles on the substrate 20 and performing metal plating on the paste, a mesh pattern may be formed.

Otherwise, on the substrate 20, a mesh pattern may be formed by printing by using a screen printing plate or a gravure printing plate.

As another option, on the substrate 20, the first conductive layer 30, the first wiring 32, the second conductive layer 40, and the second wiring 42 may be formed by using an ink jet.

Or, a resin layer formed on a film, a mold on which an embossing pattern is formed is pressed on the resin layer such that an intaglio pattern is formed on the resin layer, and then the entire surface of the resin layer including the intaglio pattern is coated with an electrode material. Thereafter, by removing the electrode material on the surface of the resin layer, a mesh pattern may be formed which is composed of the electrode material that fills the intaglio pattern of the resin layer.

Next, a method using a plating method that is a particularly preferred aspect of the touch sensor panel 10 will be mainly described.

The method for manufacturing the touch sensor panel 10 includes a step (step 1) of forming a pattern-like layer to be plated on a substrate, and a step (step 2) of forming a pattern-like metal layer on the pattern-like layer to be plated.

Hereinafter, the members and materials used in each of the steps and the procedure of the steps will be specifically described.

[Step 1: Step of Forming Pattern-Like Layer to be Plated]

Step 1 is a step of forming a pattern-like layer to be plated on a substrate by pattern-wise applying energy to a composition for forming a layer to be plated containing a compound which has a functional group interacting with a metal ion (hereinafter, referred to as "interactive group" as well) and a polymerizable group. More specifically, step 1 is a step in which, first, a coating film of the composition for forming a layer to be plated is formed on the substrate 20, energy is pattern-wise applied to the obtained coating film such that the reaction of the polymerizable group is accelerated and curing occurs, and then a region to which the energy is not applied is removed, thereby obtaining a pattern-like layer to be plated.

According to the function of the interactive group, in step 2 which will be described later, a metal ion is adsorbed onto (adheres to) the pattern-like layer to be plated formed through the aforementioned step. That is, the pattern-like layer to be plated functions as an excellent metal ion-accepting layer. Furthermore, due to the curing treatment by the application of energy, the polymerizable group is used for bonding between compounds, and as a result, it is possible to obtain a pattern-like layer to be plated having excellent hardness.

Hereinafter, first, the members and materials used in step 1 will be specifically described, and then the procedure of the step will be specifically described.

(Substrate)

The substrate 20 has two main surfaces and is constituted with, for example, a flexible transparent substrate, and is formed of an electrical insulating material because a conductive layer and the like are formed thereon. For example, it is possible to use flexible substrates such as a plastic film and a plastic plate. The plastic film and the plastic plate can be constituted with polyesters such as polyethylene terephthalate (PET) and polyethylene naphthalate (PEN), polyolefins such as polyethylene (PE), polypropylene (PP), polystyrene, ethylene vinyl acetate (EVA), a cycloolefin polymer (COP), and a cycloolefin copolymer (COC), a vinyl-based resin, polycarbonate (PC), polyamide, polyimide, an acrylic resin, triacetyl cellulose (TAC), polytetrafluoroethylene (PTFE), and the like. From the viewpoint of light transmitting properties, thermal contractility, workability, and the like, it is preferable that the substrate is constituted with polyolefins such as polyethylene terephthalate (PET), a cycloolefin polymer (COP), and a cycloolefin copolymer (COC).

As the substrate 20, it is also possible to use a treated support having undergone at least one treatment among an atmospheric plasma treatment, a corona discharge treatment, and an ultraviolet irradiation treatment. By performing the aforementioned treatments, a hydrophilic group such as a OH group is introduced into the surface of the treated support, and hence the adhesiveness of the first conductive layer 30, the first wiring 32, the second conductive layer 40, and the second wiring 42 is further improved. Among the aforementioned treatments, in view of further improving the adhesiveness of the first conductive layer 30, the first wiring 32, the second conductive layer 40, and the second wiring 42, the atmospheric plasma treatment is preferable.

The thickness of the substrate 20 is preferably 5 to 350 μm, and more preferably 30 to 150 μm. In a case where the thickness of the substrate 20 is within a range of 5 to 350 μm, a visible light transmittance is obtained as described above. That is, the substrate becomes transparent and is easily handled.

(Composition for Forming Layer to be Plated)

The composition for forming a layer to be plated contains a compound which has a functional group interacting with a metal ion and a polymerizable group.

The functional group interacting with a metal ion means a functional group interacting with a metal ion applied to the pattern-like layer to be plated in a step which will be described later. As the functional group, for example, it is possible to use a functional group which can have an electrostatic interaction with a metal ion or a nitrogen-containing functional group, a sulfur-containing functional group, an oxygen-containing functional group and the like which can be coordinated to a metal ion.

More specific examples of the interactive group include nitrogen-containing functional groups such as an amino group, an amide group, an imide group, a urea group, a tertiary amino group, an ammonium group, an amidino group, a triazine ring, a triazole ring, a benzotriazole group, an imidazole group, an benzimidazole group, a quinoline group, a pyridine group, a pyrimidine group, a pyrazine group, a quinazoline group, a quinoxaline group, a purine group, a triazine group, a piperidine group, a piperazine group, a pyrrolidine group, a pyrazole group, an aniline group, a group having an alkylamine structure, a group having an isocyanuric structure, a nitro group, a nitroso group, an azo group, a diazo group, an azide group, a cyano group, and a cyanate group (R—O—CN); oxygen-containing functional groups such as an ether group, a hydroxyl group, a phenolic hydroxyl group, a carboxyl group, a carbonate group, a carbonyl group, an ester group, a group having a N-oxide structure, a group having a S-oxide structure, and a group having a N-hydroxy structure; sulfur-containing functional groups such as a thiophene group, a thiol group, a thiourea group, a thiocyanuric acid group, a benzothiazole group, a mercaptotriazine group, a thioether group, a thioxy group, a sulfoxide group, a sulfone group, a sulfite group, a group having a sulfoximine structure, a group having a sulfoxinium salt structure, a sulfonic acid group, and a group having a sulfonic acid ester structure; phosphorus-containing functional groups such as a phosphate group, a phosphoramide group, a phosphine group, and a group having a phosphoric acid ester structure; groups having a halogen atom such as chlorine and bromine; and the like. Moreover, salts of the functional groups that can form a salt structure can be used.

Among these, an ionic polar group such as a carboxyl group, a sulfonic acid group, a phosphoric acid group, or a boronic acid group, an ether group, or a cyano group is particularly preferable because these exhibit high polarity and can be excellently adsorbed onto a metal ion and the like, and a carboxyl group or a cyano group is more preferable.

The compound may contain two or more kinds of interactive groups. The number of interactive groups contained in the compound is not particularly limited, and may be 1 or 2 or greater.

The polymerizable group is a functional group that can form a chemical bond by the application of energy, and examples thereof include a radically polymerizable group, a cationically polymerizable group, and the like. Among these, from the viewpoint of better reactivity, a radically polymerizable group is preferable. Examples of the radically polymerizable group include an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, or a maleic acid ester group, a styryl group, a vinyl group, an acrylamide group, a methacrylamide group, and the like. Among these, a methacryloyloxy group, an acryloyloxy group, a vinyl group, a styryl group, an acrylamide group, and a methacrylamide group are preferable, and a methacryloyloxy group, an acryloyloxy group, and a styryl group are particularly preferable.

The compound may contain two or more kinds of polymerizable groups. The number of polymerizable groups contained in the compound is not particularly limited, and may be 1 or 2 or greater.

The aforementioned compound may be a low-molecular weight compound or a high-molecular weight compound. The low-molecular weight compound means a compound having a molecular weight of less than 1,000, and the high-molecular weight compound means a compound having a molecular weight of equal to or greater than 1,000.

The low-molecular weight compound having the aforementioned polymerizable group corresponds to a so-called monomer. Furthermore, the high-molecular weight compound may be a polymer having a predetermined repeating unit.

One kind of compound may be used singly, or two or more kinds thereof may be used in combination.

In a case where the aforementioned compound is a polymer, the mass average molecular weight of the polymer is not particularly limited. The mass average molecular weight of the polymer is preferably equal to or greater than 1,000 and equal to or smaller than 700,000, and more preferably equal to or greater than 2,000 and equal to or smaller than 200,000, because then the handleability such as solubility is further improved. Particularly, from the viewpoint of polymerization sensitivity, the mass average molecular weight of the polymer is preferably equal to or greater than 20,000.

The method for synthesizing the aforementioned polymer having a polymerizable group and an interactive group is not particularly limited, and known synthesis methods (see paragraphs "0097" to "0125" in JP2009-280905A) can be used.

(Suitable Aspect 1 of Polymer)

As a first preferred aspect of the polymer, a copolymer can be exemplified which contains a repeating unit (hereinafter, referred to as a polymerizable group unit as appropriate) having a polymerizable group represented by Formula (a) and a repeating unit (hereinafter, referred to as an interactive group unit as appropriate) having an interactive group represented by Formula (b).

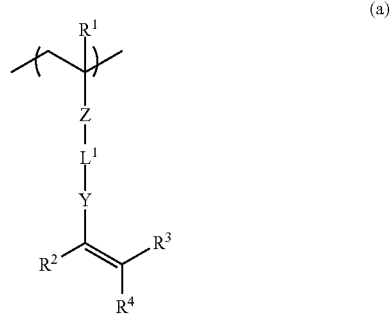

(a)

-continued

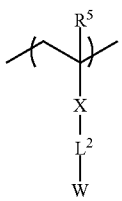

(b)

In Formulae (a) and (b), $R^1$ to $R^5$ each independently represent a hydrogen atom or a substituted or unsubstituted alkyl group (for example, a methyl group, an ethyl group, a propyl group, a butyl group, or the like). The type of the substituent is not particularly limited, but examples thereof include a methoxy group, a chlorine atom, a bromine atom, a fluorine atom, and the like.

$R^1$ is preferably a hydrogen atom, a methyl group, or a methyl group substituted with a bromine atom. $R^2$ is preferably a hydrogen atom, a methyl group, or a methyl group substituted with a bromine atom. $R^3$ is preferably a hydrogen atom. $R^4$ is preferably a hydrogen atom. $R^5$ is preferably a hydrogen atom, a methyl group, or a methyl group substituted with a bromine atom.

In Formulae (a) and (b), X, Y, and Z each independently represent a single bond or a substituted or unsubstituted divalent organic group. Examples of the divalent organic group include a substituted or unsubstituted divalent aliphatic hydrocarbon group (preferably having 1 to 8 carbon atoms, for example, an alkylene group such as a methylene group, an ethylene group, or a propylene group), a substituted or unsubstituted divalent aromatic hydrocarbon group (preferably having 6 to 12 carbon atoms, for example, a phenylene group), —O—, —S—, —SO$_2$—, —N(R)— (R: alkyl group), —CO—, —NH—, —COO—, —CONH—, a group obtained by combining these (for example, an alkyleneoxy group, an alkyleneoxycarbonyl group, and an alkylenecarbonyloxy group), and the like.

Each of X, Y, and Z is preferably a single bond, an ester group (—COO—), an amide group (—CONH—), an ether group (—O—), or a substituted or unsubstituted divalent aromatic hydrocarbon group, and more preferably a single bond, an ester group (—COO—), or an amide group (—CONH—), because then the polymer is easily synthesized, and the adhesiveness of the pattern-like metal layer is further improved.

In Formulae (a) and (b), $L^1$ and $L^2$ each independently represent a single bond or a substituted or unsubstituted divalent organic group. The divalent organic group has the same definition as the divalent organic group described above for X, Y, and Z.

$L^1$ is preferably an aliphatic hydrocarbon group or a divalent organic group (for example, an aliphatic hydrocarbon group) having a urethane bond or a urea bond, because then the polymer is easily synthesized, and the adhesiveness of the pattern-like metal layer is further improved. Particularly, $L^1$ preferably has 1 to 9 carbon atoms in total. The total number of carbon atoms in $L^1$ means the total number of carbon atoms contained in the substituted or unsubstituted divalent organic group represented by $L^1$.

$L^2$ is preferably a single bond or a divalent aliphatic hydrocarbon group, a divalent aromatic hydrocarbon group, or a group obtained by combining these, because then the adhesiveness of the pattern-like metal layer is further improved. Among these, a single bond or a group having, 1 to 15 carbon atoms in total is preferred as $L^2$. $L^2$ is particularly preferably unsubstituted. The total number of carbon atoms in $L^2$ means the total number of carbon atoms contained in the substituted or unsubstituted divalent organic group represented by $L^2$.

In Formula (b), W represents an interactive group. The definition of the interactive group is as described above.

In view of the reactivity (curing properties and polymerization properties) and the inhibition of gelation at the time of synthesis, the content of the aforementioned polymerizable group unit with respect to all the repeating units in the polymer is preferably 5 to 50 mol %, and more preferably 5 to 40 mol %.

Furthermore, from the viewpoint of the adsorptivity with respect to a metal ion, the content of the aforementioned interactive group unit with respect to all the repeating units in the polymer is preferably 5 to 95 mol %, and more preferably 10 to 95 mol %.

(Suitable Aspect 2 of Polymer)

As a second preferred aspect of the polymer, a copolymer can be exemplified which contains repeating units represented by Formulae (A), (B), and (C).

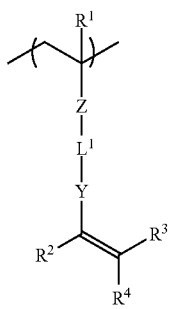

(A)

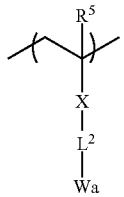

(B)

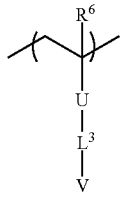

(C)

The repeating unit represented by Formula (A) is the same as the repeating unit represented by Formula (a), and the description of each group is also the same.

$R^5$, X, and $L^2$ in the repeating unit represented by Formula (B) are the same as $R^5$, X, and $L^2$ in the repeating unit represented by Formula (b), and the description of each group is also the same.

Wa in Formula (B) represents a group interacting with a metal ion, excluding a hydrophilic group represented by V which will be described later or a precursor group thereof. Wa is particularly preferably a cyano group or an ether group.

In Formula (C), $R^6$ each independently represents a hydrogen atom or a substituted or unsubstituted alkyl group.

In Formula (C), U represents a single bond or a substituted or unsubstituted divalent organic group. The divalent organic group has the same definition as the divalent organic group represented by X, Y, and Z described above. U is preferably a single bond, an ester group (—COO—), an amide group (—CONH—), an ether group (—O—), or a substituted or unsubstituted divalent aromatic hydrocarbon group, because then the polymer is easily synthesized, and the adhesiveness of the pattern-like metal layer is further improved.

In Formula (C), $L^3$ represents a single bond or a substituted or unsubstituted divalent organic group. The divalent organic group has the same definition as the divalent organic group represented by $L^1$ and $L^2$ described above. $L^3$ is preferably a single bond, a divalent aliphatic hydrocarbon group, a divalent aromatic hydrocarbon group, or a group obtained by combining these, because then the polymer is easily synthesized, and the adhesiveness of the pattern-like metal layer is further improved.

In Formula (C), V represents a hydrophilic group or a precursor group thereof. The hydrophilic group is not particularly limited as long as it exhibits hydrophilicity, and examples thereof include a hydroxyl group, a carboxylic acid group, and the like. The precursor group of the hydrophilic group means a group generating a hydrophilic group by a predetermined treatment (for example, a treatment using an aid or an alkali), and examples thereof include a carboxyl group protected with a 2-tetrahydropyranyl (THP) group and the like.

In view of the interaction with a metal ion, the hydrophilic group is preferably an ionic polar group. Examples of the ionic polar group specifically include a carboxylic acid group, a sulfonic acid group, a phosphoric acid group, and a boronic acid group. Among these, a carboxylic acid group is preferable because it has appropriate acidity (it does not decompose other functional groups).

The preferred content of each unit in the second preferred aspect of the aforementioned polymer is as described below.

In view of the reactivity (curing properties and polymerization properties) and the inhibition of gelation at the time of synthesis, the content of the repeating unit represented by Formula (A) with respect to all the repeating units in the polymer is preferably 5 to 50 mol %, and more preferably 5 to 30 mol %.

From the viewpoint of the adsortivity with respect to a metal ion, the content of the repeating unit represented by Formula (B) with respect to all the repeating units in the polymer is preferably 5 to 75 mol %, and more preferably 10 to 70 mol %.

In view of the developability in an aqueous solution the moisture-resistant adhesiveness, the content of the repeating unit represented by Formula (C) with respect to all the repeating units in the polymer is preferably 10 to 70 mol %, more preferably 20 to 60 mol %, and even more preferably 30 to 50 mol %.

Specific examples of the aforementioned polymer include the polymers described in paragraphs "0106" to "0112" in JP2009-007540A, the polymers described in paragraphs "0065" to "0070" in JP2006-135271A, the polymers described in paragraphs "0030" to "0108" in US2010-080964, and the like.

These polymers can be manufactured by known methods (for example, the methods described in the documents exemplified above).

(Suitable Aspect of Monomer)

In a case where the aforementioned compound is a so-called monomer, as a suitable aspect thereof, a compound represented by Formula (X) can be exemplified.

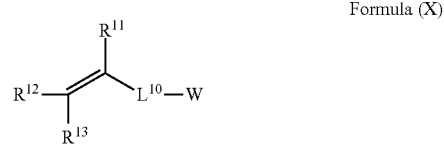

Formula (X)

In Formula (X), $R^{11}$ to $R^{13}$ each independently represent a hydrogen atom or a substituted or unsubstituted alkyl group. Examples of the unsubstituted alkyl group include a methyl group, an ethyl group, a propyl group, and a butyl group. Examples of the substituted alkyl group include a methyl group, an ethyl group, a propyl group, and a butyl group substituted with a methoxy group, a chlorine atom, a bromine atom, a fluorine atom, and the like. $R^{11}$ is preferably a hydrogen atom or a methyl group. $R^{12}$ is preferably a hydrogen atom. $R^{13}$ is preferably a hydrogen atom.

$L^{10}$ represents a single bond or a divalent organic group. Examples of the divalent organic group include a substituted or unsubstituted aliphatic hydrocarbon group (preferably having 1 to 8 carbon atoms), a substituted or unsubstituted aromatic hydrocarbon group (preferably having 6 to 12 carbon atoms), —O—, —S—, —SO$_2$—, —N(R)— (R: alkyl group), —CO—, —NH—, —COO—, —CONH—, a group obtained by combining these (for example, an alkyleneoxy group, an alkyleneoxycarbonyl group, and an alkylenecarbonyloxy group), and the like.

The substituted or unsubstituted aliphatic hydrocarbon group is preferably a methylene group, an ethylene group, a propylene group, a butylene group, or these groups substituted with a methoxy group, a chlorine atom, a bromine atom, a fluorine atom, or the like.

The substituted or unsubstituted aromatic hydrocarbon group is preferably an unsubstituted phenylene group or a phenylene group substituted with a methoxy group, a chlorine atom, a bromine atom, a fluorine atom, or the like.

As a suitable aspect of $L^{10}$ in Formula (X), a —NH-aliphatic hydrocarbon group or a —CO-aliphatic hydrocarbon group can be exemplified.

W has the same definition as W in Formula (b), and represents an interactive group. The definition of the interactive group is as described above.

As a suitable aspect of W in Formula (X), an ionic polar group can be exemplified. W is more preferably a carboxylic acid group.

In a case where the aforementioned compound is a so-called monomer, as another suitable aspect, a compound represented by Formula (1) can be exemplified.

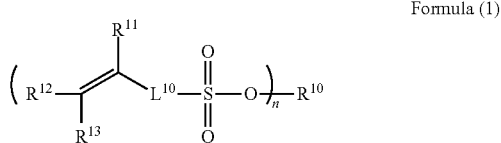

Formula (1)

In Formula (1), $R^{10}$ represents a hydrogen atom, a metal cation, or a quaternary ammonium cation. Examples of the metal cation include an alkali metal cation (a sodium ion or a calcium ion), a copper ion, a palladium ion, a silver ion, and the like. As the metal cation, a monovalent or divalent metal cation is mainly used. In a case where a divalent metal cation (for example, a palladium ion) is used, n which will be described later represents 2.

Examples of the quaternary ammonium cation include a tetramethyl ammonium ion, a tetrabutyl ammonium ion, and the like.

In view of the adherence of a metal ion and the metal residue after patterning, $R^{10}$ is particularly preferably a hydrogen atom.

$L^{10}$ in Formula (1) has the same definition as $L^{10}$ in Formula (X) described above, and represents a single bond or a divalent organic group. The definition of the divalent organic group is as described above.

$R^{11}$ to $R^{13}$ in Formula (1) have the same definition as $R^{11}$ to $R^{13}$ in Formula (X) described above, and represent a hydrogen atom or a substituted or unsubstituted alkyl group. The suitable aspects of $R^{11}$ to $R^{13}$ are as described above.

n represents an integer of 1 or 2. From the viewpoint of the availability of the compound, n is particularly preferably 1.

As a suitable aspect of the compound represented by Formula (1), a compound represented by Formula (2) can be exemplified.

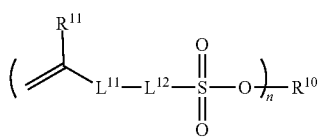

Formula (2)

In Formula (2), $R^{10}$, $R^{11}$, and n have the same definition as described above.

$L^{11}$ represents an ester group (—COO—), an amide group (—CONH—), or a phenylene group. Particularly, in a case where $L^{11}$ is an amide group, the polymerization properties and the solvent resistance (for example, alkaline solvent resistance) of the obtained layer to be plated are improved.

$L^{12}$ represents a single bond, a divalent aliphatic hydrocarbon group (preferably having 1 to 8 carbon atoms and more preferably having 3 to 5 carbon atoms), or a divalent aromatic hydrocarbon group. The aliphatic hydrocarbon group may be linear, branched, or cyclic. In a case where $L^{12}$ is a single bond, $L^{11}$ represents a phenylene group.

The molecular weight of the compound represented by Formula (1) is not particularly limited. From the viewpoint of the volatility, the solubility in a solvent, the film forming properties, handleability, and the like, the molecular weight of the compound is preferably 100 to 1,000, and more preferably 100 to 300.

The content of the aforementioned compound in the composition for forming a layer to be plated is not particularly limited, but is preferably 2% to 50% by mass and more preferably 5% to 30% by mass with respect to the total amount of the composition. In a case where the content of the compound is within the above range, the handleability of the composition becomes excellent, and the thickness of the pattern-like layer to be plated is easily controlled.

In view of handleability, it is preferable that the composition for forming a layer to be plated contains a solvent.

The usable solvent is not particularly limited, and examples thereof include water; alcohol-based solvents such as methanol, ethanol, propanol, ethylene glycol, 1-methoxy-2-propanol, glycerine, and propylene glycol monomethyl ether; acids such as acetic acid; ketone-based solvents such as acetone, methyl ethyl ketone, and cyclohexanone; amide-based solvents such as formamide, dimethyl acetamide, and N-methylpyrrolidone; nitrile-based solvents such as acetonitrile and propionitrile; ester-bases solvents such as methyl acetate and ethyl acetate; carbonate-based solvents such as dimethyl carbonate and diethyl carbonate; ether-based solvents, glycol-based solvents, amine-based solvents, thiol-based solvents, halogen-based solvents, and the like.

Among these, alcohol-based solvents, amide-based solvents, ketone-based solvents, nitrile-based solvents, and carbonate-based solvents are preferable.

The content of the solvent in the composition for forming a layer to be plated is not particularly limited, but is preferably 50% to 98% by mass and more preferably 70% to 95% by mass with respect to the total amount of the composition. In a case where the content of the solvent is within the above range, the handleability of the composition becomes excellent, and the thickness of the pattern-like layer to be plated is easily controlled.

The composition for forming a layer to be plated may contain a polymerization initiator. In a case where the composition contains a polymerization initiator, the bond between compounds and between a compound and the substrate formed more, and consequently, it is possible to obtain a pattern-like metal layer having better adhesiveness.

The polymerization initiator to be used is not particularly limited, and for example, a thermal polymerization initiator, a photopolymerization initiator, and the like can be used. Examples of the photopolymerization initiator include benzophenones, acetophenones, α-aminoalkylphenones, benzoins, ketones, thioxanthones, benzyls, benzylketals, oxime esters, anthrones, tetramethylthiuram monosulfides, bisacylphosphine oxides, acylphosphine oxides, anthraquinones, azo compounds, and derivatives of these.

Examples of the thermal polymerization initiator include diazo-based compounds, peroxide-based compounds, and the like.

In a case where the composition for forming a layer to be plated contains a polymerization initiator, the content of the polymerization initiator with respect to the total amount of the composition is preferably 0.01% to 1% by mass, and more preferably 0.1% to 0.5% by mass. In a case where the content of the polymerization initiator is within the above range, the handleability of the composition becomes excellent, and the adhesiveness of the obtained pattern-like metal layer is further improved.

The composition for forming a layer to be plated may contain a monomer (here, the compound represented by Formula (X) or (1) described above is excluded). In a case where the composition contains the monomer, the crosslink density in the layer to be plated and the like can be appropriately controlled.

The monomer to be used is not particularly limited, and examples thereof include an addition-polymerizable compound such as a compound having an ethylenically unsaturated bond, a ring-opening-polymerizable compound such as a compound having an epoxy group, and the like. Among these, it is preferable to use a polyfunctional monomer, because then the crosslink density in the pattern-like layer to be plated is improved, and the adhesiveness of the pattern-like metal layer is further improved. The polyfunctional monomer means a monomer having two or more polymerizable groups. Specifically, it is preferable to use a monomer having two to six polymerizable groups.

From the viewpoint of the motility of molecules during a cross-linking reaction that affects the reactivity, the molecular weight of the polyfunctional monomer to be used is preferably 150 to 1,000, and more preferably 200 to 700. The number of atoms that represents the interval (distance) between a plurality of polymerizable groups is preferably 1 to 15, and more preferably equal to or greater than 6 and equal to or smaller than 10.

If necessary, other additives (for example, a sensitizer, a curing agent, a polymerization inhibitor, an antioxidant, an antistatic agent, an ultraviolet absorber, a filler, particles, a flame retardant, a surfactant, a lubricant, a plasticizer, and the like) may be added to the composition for forming a layer to be plated.

(Procedure of Step 1)

In step 1, first, the composition for forming a layer to be plated is disposed on the substrate. The method for disposing the composition is not particularly limited, and for example, it is possible to use a method of bringing the composition for forming a layer to be plated into contact with the surface of the substrate such that a coating film (a precursor layer of a layer to be plated) of the composition for forming a layer to be plated is formed. Examples of the method include a method (coating method) of coating the substrate with the composition for forming a layer to be plated.

In a case where the coating method is used, the method for coating the substrate with the composition for forming a layer to be plated is not particularly limited, and known methods (for example, spin coating, die coating, dip coating, and the like) can be used.

From the viewpoint of the handleability and the manufacturing efficiency, an aspect is preferable in which the coating film is formed by coating the substrate with the composition for forming a layer to be plated and, if necessary, removing the residual solvent by performing a drying treatment.

The condition of the drying treatment is not particularly limited. In view of further improving the productivity, the drying treatment is preferably performed for 1 to 30 minutes (preferably for 1 to 10 minutes) at room temperature to 220° C. (preferably at 50° C. to 120° C.).

The method for pattern-wise applying energy to the coating film on the substrate that contains the aforementioned compound is not particularly limited. For example, it is preferable to use a heating treatment, an exposure treatment (light irradiation treatment), and the like. Among these, an exposure treatment is preferable because it is finished within a short period of time. By applying energy to the coating film, the polymerizable group in the compound is activated, the compounds are cross-linked to each other, and the layer is cured.

In the exposure treatment, light irradiation performed using a UV lamp, visible rays, and the like is carried out. Examples of the light source include a mercury lamp, a metal halide lamp, a xenon lamp, a chemical lamp, a carbon arc lamp, and the like. Examples of radiation include electron beams, X-rays, ion beams, far infrared rays, and the like. As specific aspects, scanning exposure using an infrared laser, high-illuminance flash exposure using a xenon discharge lamp or the like, infrared ray lamp exposure, and the like can be suitably exemplified. The exposure time varies with the reactivity of the compound and the light source, but is generally 10 seconds to 5 hours. The exposure energy may be about 10 to 8,000 mJ, and is preferably within a range of 50 to 3,000 mJ.

The method for pattern-wise performing the aforementioned exposure treatment is not particularly limited, and known methods can be adopted. For example, the coating film may be irradiated with exposure light through a mask.

In a case where a heating treatment is used for applying energy, it is possible to use a blast drier, an oven, an infrared drier, a heating drum, and the like.

Next, by removing a portion to which the energy is not applied within the coating film, a pattern-like layer to be plated is formed.

The aforementioned removing method is not particularly limited, and an optimal method is appropriately selected according to the compound to be used. For example, it is possible to select a method in which an alkaline solution (preferably with potential hydrogen (pH) of 13.0 to 13.8) is used as a developer. In a case where the region to which energy is not applied is removed using the alkaline solution, it is possible to adopt a method of immersing the substrate having the coating film, to which energy is applied, in the solution, a method of coating the substrate with the developer, and the like. Among these, the immersion method is preferable. In a case where the immersion method is used, from the viewpoint of the productivity, the workability, and the like, the immersion time is preferably about 1 minute to 30 minutes.

As another method, for example, it is possible to use a method of using a solvent, in which the aforementioned compound dissolves, as a developer and immersing the substrate in the developer.

(Pattern-Like Layer to be Plated)

The thickness of the pattern-like layer to be plated that is formed by the aforementioned treatments is not particularly limited. In view of the productivity, the thickness of the pattern-like layer to be plated is preferably 0.01 to 10 μm, more preferably 0.2 to 5 μm, and particularly preferably 0.3 to 3.0 μm.

The pattern shape of the pattern-like layer to be plated is not particularly limited, and is adjusted according to the place where the pattern-like metal layer is desired to be formed. For example, the pattern-like layer to be plated has a mesh pattern and the like. The shape of the lattice is not particularly limited, and may be a rhombic shape or a polygonal shape (for example, a triangular shape, a quadrangular shape, or a hexagonal shape). Furthermore, one side of each lattice may be linear, curved, or ark-like.

[Step 2: Step of Forming Pattern-Like Metal Layer]

Step 2 is a step of forming the pattern-like metal layer to be plated on the pattern-like layer to be plated by applying metal ions to the pattern-like layer to be plated formed in step 1, and performing a plating treatment on the pattern-like layer to be plated to which the metal ions are applied. By performing step 2, the pattern-like metal layer to be plated is disposed on the pattern-like layer to be plated.

Hereinafter, step 2 will be described by being divided into the step (step 2-1) of applying metal ions to the pattern-like layer to be plated and the step (step 2-2) of performing a plating treatment on the pattern-like layer to be plated to which the metal ions are applied.

(Step 2-1: Step of Applying Metal Ions)

In this step, first, metal ions are applied to the pattern-like layer to be plated. According to the function of the interactive group derived from the aforementioned compound, the applied metal ions are adsorbed onto (adhere to) the interactive group. More specifically, the metal ions are applied to both the inside and surface of the layer to be plated.

The metal ions can become a plating catalyst through a chemical reaction. More specifically, through a reduction reaction, the metal ions become a 0-valent metal which is a plating catalyst. In step 2-1, before the pattern-like layer to be plated is immersed in a plating bath (for example, an electroless plating bath) after the metal ions are applied to the pattern-like layer to be plated, the metal ions may be converted into a plating catalyst by being changed into a 0-valent metal through a reduction reaction performed separately. Alternatively, the metal ions may be immersed as they are in a plating bath and then changed into a metal (plating catalyst) by a reductant in the plating bath.

It is preferable that the metal ions are applied to the pattern-like layer to be plated by using a metal salt. The metal salt to be used is not particularly limited as long as it dissolves in an appropriate solvent and is dissociated into a metal ion and a base (anion). Examples of the metal salt include $M(NO_3)_n$, $MCl_n$, $M_{2/n}(SO_4)$, $M_{3/n}(PO_4)$ (M represents an n-valent metal atom), and the like. As the metal ions, those obtained as a result of the dissociation of the aforementioned metal salt can be suitably used. Specifically, examples of the metal ions include a Ag ion, a Cu ion, an Al ion, a Ni ion, a Co ion, a Fe ion, and a Pd ion. Among these, the ions that can form a multidentate ligand are preferable. Particularly, in view of the number of types of functional groups that can be coordinated and the catalytic ability of the functional groups, a Ag ion and a Pd ion are preferable.

As the method for applying metal ions to the pattern-like layer to be plated, for example, a metal salt is dissolved in an appropriate solvent so as to prepare a solution containing dissociated metal ions, and the pattern-like layer to be plated is coated with the solution. Alternatively, the substrate on which the pattern-like layer to be plated is formed is immersed in the solution.

As the aforementioned solvent, water or an organic solvent is appropriately used. As the organic solvent, a solvent which can permeate the pattern-like layer to be plated is preferable, and for example, acetone, methyl acetoacetate, ethyl acetoacetate, ethylene glycol diacetate, cyclohexanone, acetylacetone, acetophenone, 2-(1-cyclohexenyl) cyclohexanone, propylene glycol diacetate, triacetin, diethylene glycol diacetate, dioxane, N-methylpyrrolidone, dimethyl carbonate, dimethyl cellosolve, and the like can be used.

The metal ion concentration in the solution is not particularly limited, but s preferably 0.001% to 50% by mass and more preferably 0.005% to 30% by mass.

Furthermore, the contact time is preferably about 30 seconds to 24 hours, and more preferably about 1 minute to 1 hour.

The amount of the metal ions adsorbed onto the layer to be plated varies with the type of the plating bath to be used, the type of the catalyst metal, the type of the interactive group of the pattern-like layer to be plated, the method of use, and the like. From the viewpoint of the precipitating properties of plating, the amount of the metal ions adsorbed onto the layer to be plated is preferably 5 to 1,000 mg/m$^2$, more preferably 10 to 800 mg/m$^2$, and particularly preferably 20 to 600 mg/m$^2$.

(Step 2-2: Step of Plating Treatment)

Next, a plating treatment is performed on the pattern-like layer to be plated to which the metal ions are applied. The method of the plating treatment is not particularly limited, and examples thereof include an electroless plating treatment and an electrolytic plating treatment (electroplating treatment). In step 2-2, the electroless plating treatment may be performed alone, or, the electroless plating treatment is performed and then the electrolytic plating treatment may be performed.

In the present specification, a so-called silver mirror reaction is regarded as a kind of the aforementioned electroless plating treatment. Accordingly, for example, by reducing the metal ions adhering to the layer through the silver mirror reaction or the like, a desired pattern-like metal layer may be formed, or the electrolytic plating treatment may be additionally performed after the silver mirror reaction.

Hereinafter, the procedure of the electroless plating treatment and the electrolytic plating treatment will be specifically described.

The electroless plating treatment refers to an operation of precipitating a metal through a chemical reaction by using a solution in which metal ions desired to be precipitated as plating are dissolved.

In step 2-2, the electroless plating treatment is performed by, for example, rinsing the substrate including the pattern-like layer to be plated, to which the metal ions are applied, with water such that the surplus metal ions are removed, and then immersing the substrate in an electroless plating bath. As the electroless plating bath, known electroless plating baths can be used. In the electroless plating bath, the metal ions are reduced, and then electroless plating is performed.

The metal ions in the pattern-like layer to be plated can also be reduced through another step before the electroless plating treatment by additionally preparing a catalyst activating solution (reducing solution) unlike in the aspect in which the electroless plating solution is used as described above. The catalyst activating solution is a solution in which a reductant capable of reducing the metal ions into a 0-valent metal is dissolved. The concentration of the reductant with respect to the entirety of the solution is preferably 0.1% to 50% by mass, and more preferably 1% to 30% by mass. As the reductant, it is possible to use boron-based reductants such as sodium borohydride and dimethylamine borane and reductants such as formaldehyde and hypophosphoric acid.

At the time of immersion, it is preferable to immerse the substrate in the solution with stirring or shaking.

The general electroless plating bath is mainly composed of, in addition to a solvent (for example, water), 1. metal ions for plating, 2. reductant, 3. additive (stabilizer) for improving the stability of metal ions. The plating bath may contain known additives such as a plating bath stabilizer in addition to the above.

The organic solvent used in the electroless plating bath needs to be a solvent soluble in water. Accordingly, ketones such as acetone and alcohols such as methanol, ethanol, and isopropanol are preferably used. As the type of the metal used in the electroless plating bath, copper, tin, lead, nickel, gold, silver, palladium, and rhodium are known. Among these, from the viewpoint of conductivity, copper, silver, and gold are preferable, and copper is more preferable. According to the aforementioned metals, optimal reductant and additive are selected.

The time of immersion in the electroless plating bath is preferably about 1 minute to 6 hours, and more preferably about 1 minute to 3 hours.

The electrolytic plating treatment refers to an operation of precipitating a metal by an electric current by using a solution in which metal ions desired to be precipitated as plating are dissolved.

As described above, in step 2-2, after the electroless plating treatment, if necessary, the electrolytic plating treatment can be performed. In such an aspect, the thickness of the pattern-like metal layer to be formed can be appropriately adjusted.

As the electrolytic plating method, the methods known in the related art can be used. Examples of metals used for the electrolytic plating include copper, chromium, lead, nickel, gold, silver, tin, zinc, and the like. From the viewpoint of conductivity, copper, gold, and silver are preferable, and copper is more preferable.

The film thickness of the pattern-like metal layer obtained by the electrolytic plating can be controlled by adjusting the concentration of the metal contained in the plating bath, the current density, and the like.

The thickness of the pattern-like metal layer formed by the aforementioned procedure is not particularly limited, and optional thickness is selected according to the purpose of use. In view of conduction characteristics, the thickness of the pattern-like metal layer is preferably equal to or greater than 0.1 µm, more preferably equal to or greater than 0.5 µm, and even more preferably 1 to 30 µm.

The type of the metal constituting the pattern-like metal layer is not particularly limited, and examples of the metal include copper, chromium, lead, nickel, gold, silver, tin, zinc, and the like. From the viewpoint of conductivity, copper, gold, and silver are preferable, and copper and silver are more preferable.

The pattern shape of the pattern-like metal layer is not particularly limited. Because the pattern-like metal layer is disposed on the pattern-like layer to be plated, the pattern shape thereof is adjusted according to the pattern shape of the pattern-like layer to be plated.

The pattern-like layer to be plated having undertone the aforementioned treatments contains metal particles generated as a result of the reduction of the metal ions. The metal particles are dispersed at high density in the pattern-like layer to be plated. Furthermore, as described above, the interface between the pattern-like layer to be plated and the pattern-like metal layer forms a complicated shape, and due to the influence of such an interface shape, the pattern-like metal layer is visually recognized as a darker black layer.

In the present invention, a coating layer may be provided on the formed pattern-like metal layer. Particularly, in a case where a layer constitution is adopted in which the surface of the pattern-like metal layer is directly seen, by blackening the surface of the pattern-like metal layer, an effect of reducing the metal luster of the pattern-like metal layer and an effect of preventing copper color from noticed are obtained. In addition, a rust inhibition effect and a migration inhibition effect are also obtained.

As the blackening method, there are a lamination method and a substitution method. As the lamination method, known methods called blackening plating and the like are used, and examples thereof include a method of laminating a coating layer (blackening layer). In this method, NIKKA BLACK (manufactured by NIHON KAGAKU SANGYO CO., LTD.), an EBONYCHROME 85 series (manufactured by Metal Finishing Laboratory Co., Ltd.), and the like can be used. Examples of the substitution method include a method of preparing a coating layer (blackening layer) by sulfidizing or oxidizing the surface of the pattern-like metal layer and a method of preparing a coating layer (blackening layer) by substituting the surface of the pattern-like metal layer with a more precious metal. In the sulfidizing method, ENPLATE MB438A (manufactured by Meltex, Inc.) and the like can be used, and in the oxidizing method, PROBOND 80 (manufactured by Rohm and Hass Electronic Materials LLC) and the like can be used. In the substitution plating with a precious metal, palladium can be used.

<Laminate>

Through the aforementioned steps, a conductive laminate is formed which includes a substrate which has two main surfaces, a pattern-like layer to be plated which is disposed on at least one of the main surfaces of the substrate and formed by pattern-wise applying energy to the aforementioned composition for forming a layer to be plated, and a pattern-like metal layer which is disposed on the pattern-like layer to be plated and formed by performing a plating treatment.

In the conductive laminate, the pattern-like layer to be plated and the pattern-like metal layer may be disposed on only one of the main surfaces of the substrate or on both of two main surfaces of the substrate. In a case where the pattern-like layer to be plated and the pattern-like metal layer are disposed on both surfaces of the substrate, step 1 and step 2 may be performed on both surfaces of the substrate.

In a case where the laminate is used in the present invention, sometimes an overcoat layer, an optically transparent layer, and the like are adjacent to the laminate as an adjacent layer. For the purpose of preventing the rust of copper, to the adjacent layers, linear alkyl dicarboxylic acid such as undecanedioic acid, dodecanedioic acid, and tridecanedioic acid, phosphoric acid ester compounds such as monomethyl phosphate and monoethyl phosphate, pyridine-based compounds such as quinaldic acid, triazole-based compounds such as triazole, carboxybenzotriazole, benzotriazole, and naphthol triazole, tetrazoles such as 1H-tetrazole, tetrazole-based compounds such as benzotetrazole, bisphenol-based compounds such as 4,4'-butylidenebis-(6-tert-butyl-3-methylphenol), hindered phenol-based compounds such as pentaerythitol-tetrakis[3-(3,5-di-t-butyl-4-hydroxyphenyl)propionate], salicylic acid derivative-based compounds, hydrazide derivatives, aromatic phosphoric acid esters, thioureas, compounds having a mercapto group such as tolutriazole, 2-mercaptobenzoxazolethiol, methyl benzothiazole, and mercaptothiazoline, and triazine ring compounds may be added.

Furthermore, cyclic compounds such as crown ether and a cyclic phosphorus compound may be added to the adjacent layer.

In addition, to the adjacent layer, anionic surfactants such as an alkylbenzene sulfonic acid salt, a linear alkylbenzene sulfonic acid salt, a naphthalene sulfonic acid salt, and an alkenyl succinic acid salt, water-soluble polymers having properties of a Lewis acid such as PVP, and sulfonic acid group-containing polymers such as an arylsulfonic acid/salt polymer, polystyrene sulfonate, polyallyl sulfonate, polymethallyl sulfonate, polyvinyl sulfonate, polyisoprene sulfonate, an acrylic acid-3-sulfopropyl homopolymer, a methacrylic acid-3-sulfopropyl homopolymer, and a 2-hydroxy-3-acrylamidepropane sulfonic acid homopolymer may be added.

To the adjacent layer, hydrated antimony pentoxide, an aluminum coupling agent, a metal chelate compound such as zirconium alkoxide, a zinc compound, an aluminum compound, a barium compound, a strontium compound, and a calcium compound may also be added. As the zinc compound, there are zinc phosphate, zinc molybdate, zinc borate, zinc oxide, and the like. As the aluminum compound, there are aluminum dihydrogen tripolyphosphate, aluminum molybdate, and the like. As the barium compound, there are barium metaborate and the like. As the strontium compound, there are strontium carbonate, strontium oxide, strontium acetate, strontium metaborate, metal strontium, and the like. As the calcium compound, there are calcium phosphate, and calcium molybdate.

Furthermore, an oxidant such as ammonium persulfate, potassium persulfate, or hydrogen peroxide may be added to the adjacent layer.

In addition, dichloroisocyanurate and sodium metasilicate pentahydrate may be added to the adjacent layer in combination.

It is also possible to use known copper corrosion inhibitors. Moreover, two or more kinds of these compounds may be used in combination.

By coating the periphery of the pattern-like metal layer with a composition containing the copper corrosion inhibitors, the corrosion may be inhibited.

The substrate may further include a primer layer. In a case where the primer layer is disposed between the substrate and the pattern-like layer to be plated, the adhesiveness between the substrate and the pattern-like layer to be plated is further improved.

The thickness of the primer layer is not particularly limited. Generally, the thickness of the primer layer is preferably 0.01 to 100 μm, more preferably 0.05 to 20 μm, and even more preferably 0.05 to 10 μm.

The material of the primer layer is not particularly limited, and is preferably a resin which exhibits excellent adhesiveness with respect to the substrate. Specifically, for example, the resin may be a thermosetting resin, a thermoplastic resin, or a mixture of these. Examples of the thermosetting resin include an epoxy resin, a phenol resin, a polyimide resin, a polyester resin, a bismaleimide resin, a polyolefin-based resin, an isocyanate-based resin, and the like. Examples of the thermoplastic resin include a phenoxy resin, polyether sulfone, polysulfone, polyphenylene sulfone, polyphenylene sulfide, polyphenyl ether, polyether imide, an acrylonitrile-butadiene-styrene copolymer (ABS resin), and the like.

One kind of thermosetting resin and one kind of thermoplastic resin may be used singly, or two or more kinds of each may be used in combination. Furthermore, a resin containing a cyano group may also be used, and specifically, an ABS resin and "polymer containing a unit having a cyano group on a side chain" described in paragraphs "0039" to "0063" in JP2010-84196A may be used.

In addition, rubber components such as acrylonitrile-butadiene rubber (NBR rubber) and styrene-butadiene rubber (SBR rubber) can also be used.

As a suitable aspect of the material constituting the primer layer, a polymer can be exemplified which has a conjugated diene compound unit that may be hydrogenated. The conjugated diene compound unit means a repeating unit derived from a conjugated diene compound. The conjugated diene compound is not particularly limited as long as it is a compound having a molecular structure having two carbon-carbon double bonds separated by one single bond.

As a suitable aspect of the repeating unit derived from the conjugated diene compound, a repeating unit can be exemplified which is generated by a polymerization reaction of a compound having a butadiene skeleton.

The conjugated diene compound unit may be hydrogenated. It is preferable that the aforementioned polymer contains a hydrogenated conjugated diene compound unit, because then the adhesiveness of the pattern-like metal layer is further improved. That is, the double bonds in the repeating unit derived from the conjugated diene compound may be hydrogenated.

The polymer having the conjugated diene compound unit that may be hydrogenated may contain the aforementioned interactive group.

As suitable aspects of the polymer, acrylonitrile-butadiene rubber (NBR), carboxyl group-containing nitrile rubber (XNBR), acrylonitrile-butadiene-isoprene rubber (NBIR), an acrylonitrile-butadiene-styrene copolymer (ABS resin), hydrogenated substances of these (for example, hydrogenated acrylonitrile-butadiene rubber), and the like can be exemplified.

The primer layer may contain other additives (for example, a sensitizer, an antioxidant, an antistatic agent, an ultraviolet absorber, a filler, particles, a flame retardant, a surfactant, a lubricant, a plasticizer, and the like).

The method for forming the primer layer is not particularly limited, and examples thereof include a method of laminating a resin to be used on a substrate, a method of dissolving necessary components in a solvent that can dissolve the components, coating the surface of the substrate with the solution by a method such as coating, and drying the solution, and the like.

As the heating temperature and heating time in the coating method, the condition under which the coating solvent can be sufficiently dried may be selected. In view of manufacturing suitability, it is preferable to select a heating condition under which the heating temperature is equal to or lower than 200° C. and the heating time is within a range of 60 minutes, and it is more preferable to select a heating condition under which the heating temperature is 40° C. to 100° C. and the heating time is within a range of 20 minutes. As the solvent to be used, an optimal solvent (for example, cyclohexanone or methyl ethyl ketone) is appropriately selected according to the resin to be used.

In a case where a substrate on which the aforementioned primer layer is disposed is used, by performing step 1 and step 2 on the primer layer, a desired conductive laminate is obtained.

The touch sensor panel 10 may be provided with a functional layer such as an antireflection layer.

[Calender Treatment]

A calender treatment may be performed on the metal portion such that the metal portion is smoothed. In this way, the conductivity of the metal portion is markedly enhanced. The calender treatment can be performed using calender rolls. In a preferred aspect, the calender rolls generally consist of a pair of rolls.

As the rolls used in the calender treatment, plastic rolls of epoxy, polyimide, polyamide, polyimide amide, and the like or metal rolls are suitably used. Particularly, in a case where the substrate has emulsion layers on both surfaces, it is preferable to treat the substrate with metal rolls. In a case where the substrate has an emulsion layer on one surface, in view of preventing wrinkles, a metal roll and a plastic roll can be combined. The lower limit of the line pressure is preferably equal to or higher than 1,960 N/cm (200 kgf/cm which is 699.4 kgf/cm$^2$ (65.6 MPa) in a case of being converted into a surface pressure), and more preferably equal to or higher than 2,940 N/cm (300 kgf/cm which is 935.8 kgf/cm$^2$ (91.8 MPa) in a case of being converted into a surface pressure). The upper limit of the line pressure is equal to or lower than 6,880 N/cm (700 kgf/cm).

The application temperature of the smoothing treatment represented by the calender rolls is preferably 10° C. (no temperature adjustment) to 100° C. The temperature is more preferably within a range of about 10° C. (no temperature adjustment) to 50° C., although the temperature varies with the density or shape of lines drawn for forming a metal mesh pattern or a metal wiring pattern or with the type of binder. "10° C. (no temperature adjustment)" is a state where the temperature is not adjusted.

The present invention can be used by being appropriately combined with the techniques disclosed in the publications of unexamined applications and the pamphlets of international publications described in the following Tables 1 and 2. The marks such as "JP", "No.", and "Pamphlet No." will not be listed.

TABLE 1

| | | | | |
|---|---|---|---|---|
| 2004-221564 | 2004-221565 | 2007-200922 | 2006-352073 | 2006-228469 |
| 2007-235115 | 2007-207987 | 2006-012935 | 2006-010795 | 2007-072171 |
| 2006-332459 | 2009-21153 | 2007-226215 | 2006-261315 | 2006-324203 |
| 2007-102200 | 2006-228473 | 2006-269795 | 2006-336090 | 2006-336099 |
| 2006-228478 | 2006-228836 | 2007-009326 | 2007-201378 | 2007-335729 |
| 2006-348351 | 2007-270321 | 2007-270322 | 2007-178915 | 2007-334325 |
| 2007-134439 | 2007-149760 | 2007-208133 | 2007-207883 | 2007-013130 |
| 2007-310091 | 2007-116137 | 2007-088219 | 2008-227351 | 2008-244067 |
| 2005-302508 | 2008-218784 | 2008-227350 | 2008-277676 | 2008-282840 |
| 2008-267814 | 2008-270405 | 2008-277675 | 2008-300720 | 2008-300721 |
| 2008-283029 | 2008-288305 | 2008-288419 | 2009-21334 | 2009-26933 |
| 2009-4213 | 2009-10001 | 2009-16526 | 2008-171568 | 2008-198388 |
| 2008-147507 | 2008-159770 | 2008-159771 | 2008-235224 | 2008-235467 |
| 2008-218096 | 2008-218264 | 2008-224916 | 2008-252046 | 2008-277428 |
| 2008-241987 | 2008-251274 | 2008-251275 | 2007-129205 | |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

The present invention is basically constituted as above. Hitherto, the touch sensor panel of the present invention has been specifically described, but the present invention is not limited to the aforementioned embodiments. It goes without saying that the present invention may be ameliorated or modified in various ways within a scope that does not depart from the gist of the present invention.

EXPLANATION OF REFERENCES

- 10, 10a, 10b: touch sensor panel
- 12: touch sensor portion
- 12c: corner portion
- 12e: end
- 12g: wire connection region
- 13: display device
- 14: control board
- 15: flexible printed circuits
- 16, 80: antenna
- 17: mobile terminal apparatus
- 18a: sensor portion
- 18b: peripheral wiring portion
- 19, 19a, 19b, 19c: transmission line portion
- 20, 21, 102: substrate
- 20a, 21a, 102a: front surface
- 20b, 102b: rear surface
- 22: adhesive layer
- 24: protective layer
- 26: adhesive layer
- 30: first conductive layer
- 32: first wiring
- 35: conductive thin wire
- 37: cell
- 39: mesh pattern
- 40: second conductive layer
- 42: second wiring
- 50, 104: signal wire
- 52, 106: ground wire
- 52a, 52b: end
- 52c: lateral surface
- 54: connection portion
- 56: virtual ground wire
- 56c: end face
- 58, 59: ground conductor
- 58a, 59a, 82a, 84a: long side portion
- 60: anti-resonance wire
- 62: conductive wire
- 64: connection terminal
- 66: connection portion
- 70, 72: transmission line portion
- 82: conductor
- 84: inverted L-shaped antenna
- 85: EBONYCHROME
- 100: transmission line portion
- Bs: virtual ground plane
- D: disposition region
- Ds: region
- L: ground wire length
- Pa: length
- W: width
- $W_D$: interwire distance $W_D$
- Wc: connection width
- Ws: width
- d: line width

What is claimed is:

1. A touch sensor panel comprising:
a substrate;
a touch sensor portion which is provided on the substrate and includes a detection portion and a peripheral wiring portion;
an antenna provided on the substrate;
a transmission line portion which is provided on the substrate and connected to the antenna; and
a control board connected to the touch sensor portion and the transmission line portion,
wherein the transmission line portion has a signal wire which is provided on one surface of the substrate and connected to the antenna and two ground wires which are provided on the other surface of the substrate across a disposition region corresponding to a region, in which the signal wire is provided, and electrically connected to each other at least at an end of the transmission line portion on the antenna side.

2. The touch sensor panel according to claim 1, wherein an anti-resonance wire formed of a conductive wire is provided on a lateral surface of each of the ground wires.

3. The touch sensor panel according to claim 1, wherein a plurality of connection terminals are formed at an end of each of the ground wires on the control board side.

4. The touch sensor panel according to claim 1, wherein the peripheral wiring portion included in the touch sensor portion, the transmission line portion, and the antenna are formed of the same material.

5. The touch sensor panel according to claim 1, wherein the peripheral wiring portion included in the touch sensor portion, the transmission line portion, and the antenna have the same thickness.

6. The touch sensor panel according to claim 1, wherein a sheet resistance of the transmission line portion is 0.01 to 10 Ω/sq.

7. The touch sensor panel according to claim 2, wherein the peripheral wiring portion included in the touch sensor portion, the transmission line portion, and the antenna are formed of the same material.

8. The touch sensor panel according to claim 3,
wherein the peripheral wiring portion included in the touch sensor portion, the transmission line portion, and the antenna are formed of the same material.

9. The touch sensor panel according to claim 2,
wherein the peripheral wiring portion included in the touch sensor portion, the transmission line portion, and the antenna have the same thickness.

10. The touch sensor panel according to claim 3,
wherein the peripheral wiring portion included in the touch sensor portion, the transmission line portion, and the antenna have the same thickness.

11. The touch sensor panel according to claim 4,
wherein the peripheral wiring portion included in the touch sensor portion, the transmission line portion, and the antenna have the same thickness.

12. The touch sensor panel according to claim 2,
wherein a sheet resistance of the transmission line portion is 0.01 to 10 Ω/sq.

13. The touch sensor panel according to claim 3,
wherein a sheet resistance of the transmission line portion is 0.01 to 10 Ω/sq.

14. The touch sensor panel according to claim 4,
wherein a sheet resistance of the transmission line portion is 0.01 to 10 Ω/sq.

15. The touch sensor panel according to claim 5,
wherein a sheet resistance of the transmission line portion is 0.01 to 10 Ω/sq.

16. The touch sensor panel according to claim 1,
wherein the signal wire and the ground wires are constituted with a mesh-like conductor.

* * * * *